(12) United States Patent
Wykes et al.

(10) Patent No.: US 8,781,533 B2
(45) Date of Patent: Jul. 15, 2014

(54) ALTERNATIVE INPUTS OF A MOBILE COMMUNICATIONS DEVICE

(75) Inventors: David Henry Wykes, Seattle, WA (US); Sayim Catherine Kim, Seattle, WA (US); Audrey Louchart, Seattle, WA (US); Michael J. Kruzeniski, Seattle, WA (US); Kathleen W. Holmes, Seattle, WA (US); Jonathan D. Friedman, Seattle, WA (US); Joseph P. Marquardt, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 220 days.

(21) Appl. No.: 13/270,111

(22) Filed: Oct. 10, 2011

(65) Prior Publication Data

US 2012/0028687 A1 Feb. 2, 2012

Related U.S. Application Data

(63) Continuation of application No. 12/414,458, filed on Mar. 30, 2009, now Pat. No. 8,086,275.

(60) Provisional application No. 61/107,945, filed on Oct. 23, 2008, provisional application No. 61/107,935, filed on Oct. 23, 2008, provisional application No. 61/107,921, filed on Oct. 23, 2008.

(51) Int. Cl.
*H04B 1/38* (2006.01)

(52) U.S. Cl.
USPC ........................................ 455/566; 455/456.1

(58) Field of Classification Search
USPC ........... 455/556, 456.1, 456.3, 418, 450, 561, 455/466, 566, 557; 345/169, 173, 168
See application file for complete search history.

(56) References Cited

U.S. PATENT DOCUMENTS

| 5,189,732 A | 2/1993 | Kondo |
| 5,258,748 A | 11/1993 | Jones |
| 5,463,725 A | 10/1995 | Henckel et al. |
| 5,515,495 A | 5/1996 | Ikemoto |
| 5,574,836 A | 11/1996 | Broemmelsiek |

(Continued)

FOREIGN PATENT DOCUMENTS

| CN | 1749936 | 3/2006 |
| CN | 1936797 | 3/2007 |

(Continued)

OTHER PUBLICATIONS

"EP Search Report", European Application No. 10762112.0, (Aug. 2, 2013), 7 Pages.
"Foreign Office Action", Chinese Application No. 200980142644.1, (Aug. 20, 2013), 9 Pages.
"Foreign Office Action", Chinese Application No. 200980142661.5, (Sep. 24, 2013), 8 Pages.
"Foreign Office Action", Japanese Application No. 2011-533353, (Jul. 5, 2013), 9 Pages.
"Non-Final Office Action", U.S. Appl. No. 12/469,480, (Aug. 27, 2013), 22 pages.

(Continued)

*Primary Examiner* — Joseph Lauture
(74) *Attorney, Agent, or Firm* — Sung Kim; Andrew Sanders; Micky Minhas

(57) ABSTRACT

In an implementation, a mobile communications device includes a display device having touchscreen functionality, a keyboard having a plurality of physical keys that include a dedicated key and letter keys arranged according to a QWERTY layout, and one or more modules. The one or more modules are configured to output a user interface on the display device responsive to selection of the dedicated key, the user interface having a plurality of portions that are selectable via the touchscreen functionality to cause input of a respective one of a plurality of emoticons.

20 Claims, 7 Drawing Sheets

(56) References Cited

U.S. PATENT DOCUMENTS

| | | |
|---|---|---|
| 5,675,329 A | 10/1997 | Barker |
| 5,860,073 A | 1/1999 | Ferrel et al. |
| 5,905,492 A | 5/1999 | Straub et al. |
| 5,914,720 A | 6/1999 | Maples et al. |
| 5,963,204 A | 10/1999 | Ikeda et al. |
| 6,008,816 A | 12/1999 | Eisler |
| 6,184,879 B1 | 2/2001 | Minemura et al. |
| 6,317,142 B1 | 11/2001 | Decoste et al. |
| 6,385,630 B1 | 5/2002 | Ejerhed |
| 6,396,963 B2 | 5/2002 | Shaffer |
| 6,424,338 B1 | 7/2002 | Andersone |
| 6,507,643 B1 | 1/2003 | Groner |
| 6,570,582 B1 | 5/2003 | Sciammarella et al. |
| 6,662,023 B1 | 12/2003 | Helle |
| 6,697,825 B1 | 2/2004 | Underwood et al. |
| 6,784,925 B1 | 8/2004 | Tomat |
| 6,865,297 B2 | 3/2005 | Loui |
| 6,876,312 B2 | 4/2005 | Yu |
| 6,904,597 B2 | 6/2005 | Jin |
| 6,961,731 B2 | 11/2005 | Holbrook |
| 6,983,310 B2 | 1/2006 | Rouse |
| 6,987,991 B1 | 1/2006 | Nelson |
| 7,007,238 B2 | 2/2006 | Glaser |
| 7,013,041 B2 | 3/2006 | Miyamoto |
| 7,058,955 B2 | 6/2006 | Porkka |
| 7,065,385 B2 | 6/2006 | Jarrad et al. |
| 7,065,386 B1 | 6/2006 | Smethers |
| 7,111,044 B2 | 9/2006 | Lee |
| 7,133,707 B1 | 11/2006 | Rak |
| 7,133,859 B1 | 11/2006 | Wong |
| 7,139,800 B2 | 11/2006 | Bellotti et al. |
| 7,158,123 B2 | 1/2007 | Myers |
| 7,178,111 B2 | 2/2007 | Glein et al. |
| 7,197,702 B2 | 3/2007 | Niyogi et al. |
| 7,213,079 B2 | 5/2007 | Narin |
| 7,216,588 B2 | 5/2007 | Suess |
| 7,249,326 B2 | 7/2007 | Stoakley et al. |
| 7,280,097 B2 | 10/2007 | Chen |
| 7,283,620 B2 | 10/2007 | Adamczyk |
| 7,289,806 B2 | 10/2007 | Morris et al. |
| 7,296,184 B2 | 11/2007 | Derks et al. |
| 7,336,263 B2 | 2/2008 | Valikangas |
| 7,369,647 B2 | 5/2008 | Gao et al. |
| 7,388,578 B2 | 6/2008 | Tao |
| 7,403,191 B2 | 7/2008 | Sinclair |
| 7,447,520 B2 | 11/2008 | Scott |
| 7,461,151 B2 | 12/2008 | Colson et al. |
| 7,479,949 B2 | 1/2009 | Jobs |
| 7,480,870 B2 | 1/2009 | Anzures |
| 7,483,418 B2 | 1/2009 | Maurer |
| 7,496,830 B2 | 2/2009 | Rubin |
| 7,593,995 B1 | 9/2009 | He et al. |
| 7,606,714 B2 | 10/2009 | Williams et al. |
| 7,610,563 B2 | 10/2009 | Nelson et al. |
| 7,614,018 B1 | 11/2009 | Ohazama et al. |
| 7,619,615 B1 | 11/2009 | Donoghue |
| 7,640,518 B2 | 12/2009 | Forlines et al. |
| 7,657,849 B2 | 2/2010 | Chaudhri et al. |
| 7,671,756 B2 | 3/2010 | Herz et al. |
| 7,681,138 B2 | 3/2010 | Grasser et al. |
| 7,702,683 B1 | 4/2010 | Kirshenbaum |
| 7,730,425 B2 | 6/2010 | de los Reyes et al. |
| 7,746,388 B2 | 6/2010 | Jeon |
| 7,755,674 B2 | 7/2010 | Kaminaga |
| 7,782,332 B2 | 8/2010 | Nagata |
| 7,834,861 B2 | 11/2010 | Lee |
| 7,877,707 B2 | 1/2011 | Westerman et al. |
| 7,889,180 B2 | 2/2011 | Byun et al. |
| 7,983,718 B1 | 7/2011 | Roka |
| 8,006,276 B2 | 8/2011 | Nakagawa et al. |
| 8,074,174 B2 | 12/2011 | Suzuki et al. |
| 8,086,275 B2 | 12/2011 | Wykes et al. |
| 8,127,254 B2 | 2/2012 | Lindberg et al. |
| 8,131,808 B2 | 3/2012 | Aoki et al. |
| 8,150,924 B2 | 4/2012 | Buchheit et al. |
| 8,175,653 B2 | 5/2012 | Smuga |
| 8,238,526 B1 | 8/2012 | Seth et al. |
| 8,238,876 B2 | 8/2012 | Teng |
| 8,250,494 B2 | 8/2012 | Butcher |
| 8,255,473 B2 | 8/2012 | Eren et al. |
| 8,269,736 B2 | 9/2012 | Wilairat |
| 8,280,901 B2 | 10/2012 | McDonald |
| 8,289,688 B2 | 10/2012 | Behar et al. |
| 8,294,715 B2 | 10/2012 | Patel et al. |
| 8,299,943 B2 * | 10/2012 | Longe ............................ 341/22 |
| 8,355,698 B2 | 1/2013 | Teng et al. |
| 8,385,952 B2 | 2/2013 | Friedman et al. |
| 8,411,046 B2 | 4/2013 | Kruzeniski et al. |
| 8,448,083 B1 | 5/2013 | Migos et al. |
| 8,548,431 B2 | 10/2013 | Teng et al. |
| 8,634,876 B2 | 1/2014 | Friedman et al. |
| 2001/0022621 A1 | 9/2001 | Squibbs |
| 2002/0000963 A1 | 1/2002 | Yoshida et al. |
| 2002/0018051 A1 | 2/2002 | Singh |
| 2002/0026349 A1 | 2/2002 | Reilly et al. |
| 2002/0035607 A1 | 3/2002 | Checkoway |
| 2002/0060701 A1 | 5/2002 | Naughton et al. |
| 2002/0070961 A1 | 6/2002 | Xu et al. |
| 2002/0091755 A1 | 7/2002 | Narin |
| 2002/0128036 A1 | 9/2002 | Yach et al. |
| 2002/0129061 A1 | 9/2002 | Swart et al. |
| 2002/0138248 A1 | 9/2002 | Corston-Oliver et al. |
| 2002/0142762 A1 | 10/2002 | Chmaytelli et al. |
| 2002/0154176 A1 | 10/2002 | Barksdale et al. |
| 2003/0003899 A1 | 1/2003 | Tashiro et al. |
| 2003/0008686 A1 | 1/2003 | Park et al. |
| 2003/0011643 A1 | 1/2003 | Nishihata |
| 2003/0040300 A1 | 2/2003 | Bodic et al. |
| 2003/0073414 A1 | 4/2003 | Capps |
| 2003/0096604 A1 | 5/2003 | Vollandt |
| 2003/0105827 A1 | 6/2003 | Tan et al. |
| 2003/0135582 A1 | 7/2003 | Allen et al. |
| 2003/0187996 A1 | 10/2003 | Cardina et al. |
| 2003/0222907 A1 | 12/2003 | Heikes et al. |
| 2003/0225846 A1 | 12/2003 | Heikes et al. |
| 2003/0234799 A1 | 12/2003 | Lee |
| 2004/0015553 A1 | 1/2004 | Griffin et al. |
| 2004/0068543 A1 | 4/2004 | Seifert |
| 2004/0078299 A1 | 4/2004 | Down-Logan et al. |
| 2004/0111673 A1 | 6/2004 | Bowman et al. |
| 2004/0137884 A1 | 7/2004 | Engstrom et al. |
| 2004/0185883 A1 | 9/2004 | Rukman |
| 2004/0212586 A1 | 10/2004 | Denny |
| 2004/0217954 A1 | 11/2004 | O'Gorman et al. |
| 2004/0250217 A1 | 12/2004 | Tojo et al. |
| 2005/0054384 A1 | 3/2005 | Pasquale et al. |
| 2005/0060647 A1 | 3/2005 | Doan et al. |
| 2005/0060665 A1 | 3/2005 | Rekimoto |
| 2005/0079896 A1 | 4/2005 | Kokko et al. |
| 2005/0085215 A1 | 4/2005 | Kokko |
| 2005/0085272 A1 | 4/2005 | Anderson et al. |
| 2005/0114788 A1 | 5/2005 | Fabritius |
| 2005/0143138 A1 * | 6/2005 | Lee et al. ...................... 455/566 |
| 2005/0182798 A1 | 8/2005 | Todd et al. |
| 2005/0183021 A1 | 8/2005 | Allen et al. |
| 2005/0184999 A1 | 8/2005 | Daioku |
| 2005/0198159 A1 | 9/2005 | Kirsch |
| 2005/0216300 A1 | 9/2005 | Appelman et al. |
| 2005/0223057 A1 | 10/2005 | Buchheit et al. |
| 2005/0232166 A1 | 10/2005 | Nierhaus |
| 2005/0250547 A1 | 11/2005 | Salman et al. |
| 2005/0273614 A1 | 12/2005 | Ahuja |
| 2005/0280719 A1 | 12/2005 | Kim |
| 2006/0004685 A1 | 1/2006 | Pyhalammi et al. |
| 2006/0005207 A1 | 1/2006 | Louch et al. |
| 2006/0015736 A1 | 1/2006 | Callas et al. |
| 2006/0015812 A1 | 1/2006 | Cunningham |
| 2006/0026013 A1 | 2/2006 | Kraft |
| 2006/0059430 A1 | 3/2006 | Bells |
| 2006/0070005 A1 | 3/2006 | Gilbert et al. |
| 2006/0074771 A1 | 4/2006 | Kim |
| 2006/0103623 A1 | 5/2006 | Davis |
| 2006/0129543 A1 | 6/2006 | Bates et al. |
| 2006/0135220 A1 | 6/2006 | Kim et al. |

(56) References Cited

U.S. PATENT DOCUMENTS

| | | |
|---|---|---|
| 2006/0136773 A1 | 6/2006 | Kespohl et al. |
| 2006/0152803 A1 | 7/2006 | Provitola |
| 2006/0172724 A1 | 8/2006 | Linkert et al. |
| 2006/0173911 A1 | 8/2006 | Levin et al. |
| 2006/0199598 A1 | 9/2006 | Lee et al. |
| 2006/0206590 A1 | 9/2006 | Wakasa et al. |
| 2006/0218234 A1 | 9/2006 | Deng et al. |
| 2006/0246955 A1 | 11/2006 | Nirhamo |
| 2006/0253801 A1 | 11/2006 | Okaro et al. |
| 2006/0259870 A1 | 11/2006 | Hewitt et al. |
| 2006/0259873 A1 | 11/2006 | Mister |
| 2006/0271520 A1 | 11/2006 | Ragan |
| 2006/0281448 A1 | 12/2006 | Plestid et al. |
| 2006/0293088 A1 | 12/2006 | Kokubo |
| 2006/0294396 A1 | 12/2006 | Witman |
| 2007/0005716 A1 | 1/2007 | LeVasseur et al. |
| 2007/0011610 A1 | 1/2007 | Sethi et al. |
| 2007/0015532 A1 | 1/2007 | Deelman |
| 2007/0024646 A1 | 2/2007 | Saarinen |
| 2007/0035513 A1 | 2/2007 | Sherrard et al. |
| 2007/0038567 A1 | 2/2007 | Allaire et al. |
| 2007/0054679 A1 | 3/2007 | Cho et al. |
| 2007/0061306 A1 | 3/2007 | Pell et al. |
| 2007/0061714 A1 | 3/2007 | Stuple et al. |
| 2007/0067272 A1 | 3/2007 | Flynt |
| 2007/0073718 A1 | 3/2007 | Ramer |
| 2007/0076013 A1 | 4/2007 | Campbell |
| 2007/0080954 A1 | 4/2007 | Griffin |
| 2007/0082707 A1 | 4/2007 | Flynt et al. |
| 2007/0082708 A1 | 4/2007 | Griffin |
| 2007/0106635 A1 | 5/2007 | Frieden et al. |
| 2007/0118801 A1 | 5/2007 | Harshbarger et al. |
| 2007/0127638 A1 | 6/2007 | Doulton |
| 2007/0150826 A1 | 6/2007 | Anzures et al. |
| 2007/0150842 A1 | 6/2007 | Chaudhri et al. |
| 2007/0157089 A1 | 7/2007 | Van Os et al. |
| 2007/0162850 A1 | 7/2007 | Adler et al. |
| 2007/0171192 A1 | 7/2007 | Seo et al. |
| 2007/0171238 A1 | 7/2007 | Ubillos et al. |
| 2007/0182595 A1 | 8/2007 | Ghasabian |
| 2007/0185847 A1 | 8/2007 | Budzik et al. |
| 2007/0192707 A1 | 8/2007 | Maeda et al. |
| 2007/0198420 A1 | 8/2007 | Goldstein |
| 2007/0211034 A1* | 9/2007 | Griffin et al. ............... 345/169 |
| 2007/0214422 A1 | 9/2007 | Agarwal et al. |
| 2007/0214429 A1 | 9/2007 | Lyudovyk et al. |
| 2007/0216651 A1 | 9/2007 | Patel |
| 2007/0225022 A1 | 9/2007 | Satake |
| 2007/0232342 A1 | 10/2007 | Larocca |
| 2007/0233654 A1 | 10/2007 | Karlson |
| 2007/0238488 A1 | 10/2007 | Scott |
| 2007/0247435 A1 | 10/2007 | Benko et al. |
| 2007/0250583 A1 | 10/2007 | Hardy |
| 2007/0253758 A1 | 11/2007 | Suess |
| 2007/0255831 A1 | 11/2007 | Hayashi et al. |
| 2007/0256029 A1 | 11/2007 | Maxwell |
| 2007/0257891 A1 | 11/2007 | Esenther et al. |
| 2007/0257933 A1 | 11/2007 | Klassen |
| 2007/0262964 A1 | 11/2007 | Zotov et al. |
| 2007/0263843 A1 | 11/2007 | Foxenland |
| 2007/0273663 A1 | 11/2007 | Park et al. |
| 2007/0280457 A1 | 12/2007 | Aberethy |
| 2007/0281747 A1 | 12/2007 | Pletikosa |
| 2008/0005668 A1 | 1/2008 | Mavinkurve |
| 2008/0032681 A1 | 2/2008 | West |
| 2008/0036743 A1 | 2/2008 | Westerman |
| 2008/0048986 A1 | 2/2008 | Khoo |
| 2008/0052370 A1 | 2/2008 | Snyder |
| 2008/0057910 A1 | 3/2008 | Thoresson et al. |
| 2008/0057926 A1 | 3/2008 | Forstall et al. |
| 2008/0066010 A1 | 3/2008 | Brodersen et al. |
| 2008/0068447 A1 | 3/2008 | Mattila et al. |
| 2008/0076472 A1 | 3/2008 | Hyatt |
| 2008/0082934 A1 | 4/2008 | Kocienda et al. |
| 2008/0084970 A1 | 4/2008 | Harper |
| 2008/0085700 A1 | 4/2008 | Arora |
| 2008/0092057 A1 | 4/2008 | Monson et al. |
| 2008/0102863 A1 | 5/2008 | Hardy |
| 2008/0114535 A1 | 5/2008 | Nesbitt |
| 2008/0120571 A1 | 5/2008 | Chang et al. |
| 2008/0132252 A1 | 6/2008 | Altman et al. |
| 2008/0153551 A1 | 6/2008 | Baek et al. |
| 2008/0155425 A1 | 6/2008 | Murthy et al. |
| 2008/0155437 A1 | 6/2008 | Morris |
| 2008/0162651 A1 | 7/2008 | Madnani |
| 2008/0165132 A1 | 7/2008 | Weiss |
| 2008/0165136 A1 | 7/2008 | Christie et al. |
| 2008/0165163 A1 | 7/2008 | Bathiche |
| 2008/0167058 A1 | 7/2008 | Lee et al. |
| 2008/0168290 A1 | 7/2008 | Jobs et al. |
| 2008/0168403 A1 | 7/2008 | Westerman et al. |
| 2008/0172609 A1 | 7/2008 | Rytivaara |
| 2008/0180399 A1 | 7/2008 | Cheng |
| 2008/0182628 A1 | 7/2008 | Lee et al. |
| 2008/0189658 A1 | 8/2008 | Jeong et al. |
| 2008/0198141 A1 | 8/2008 | Lee et al. |
| 2008/0200142 A1 | 8/2008 | Abdel-Kader et al. |
| 2008/0208973 A1 | 8/2008 | Hayashi |
| 2008/0222560 A1 | 9/2008 | Harrison |
| 2008/0222569 A1 | 9/2008 | Champion |
| 2008/0242362 A1 | 10/2008 | Duarte |
| 2008/0259042 A1 | 10/2008 | Thorn |
| 2008/0261660 A1 | 10/2008 | Huh et al. |
| 2008/0263457 A1 | 10/2008 | Kim et al. |
| 2008/0270558 A1 | 10/2008 | Ma |
| 2008/0295017 A1 | 11/2008 | Tseng et al. |
| 2008/0297475 A1 | 12/2008 | Woolf et al. |
| 2008/0299999 A1 | 12/2008 | Lockhart et al. |
| 2008/0301046 A1 | 12/2008 | Martinez et al. |
| 2008/0301575 A1 | 12/2008 | Fermon |
| 2008/0307364 A1 | 12/2008 | Chaudhri et al. |
| 2008/0309626 A1 | 12/2008 | Westerman et al. |
| 2008/0316177 A1 | 12/2008 | Tseng |
| 2008/0317240 A1 | 12/2008 | Chang et al. |
| 2009/0007017 A1 | 1/2009 | Anzures et al. |
| 2009/0012952 A1 | 1/2009 | Fredriksson |
| 2009/0029736 A1 | 1/2009 | Kim et al. |
| 2009/0037469 A1 | 2/2009 | Kirsch |
| 2009/0051671 A1 | 2/2009 | Konstas |
| 2009/0061837 A1 | 3/2009 | Chaudhri et al. |
| 2009/0061948 A1 | 3/2009 | Lee et al. |
| 2009/0064055 A1 | 3/2009 | Chaudhri |
| 2009/0077649 A1 | 3/2009 | Lockhart |
| 2009/0083656 A1 | 3/2009 | Dukhon |
| 2009/0083850 A1 | 3/2009 | Fadell et al. |
| 2009/0085851 A1 | 4/2009 | Lim |
| 2009/0085878 A1 | 4/2009 | Heubel |
| 2009/0089215 A1 | 4/2009 | Newton |
| 2009/0106694 A1 | 4/2009 | Kraft et al. |
| 2009/0109243 A1 | 4/2009 | Kraft |
| 2009/0111447 A1 | 4/2009 | Nurmi |
| 2009/0117942 A1 | 5/2009 | Boningue et al. |
| 2009/0140061 A1 | 6/2009 | Schultz et al. |
| 2009/0140986 A1 | 6/2009 | Karkkainen et al. |
| 2009/0146962 A1 | 6/2009 | Ahonen et al. |
| 2009/0153492 A1 | 6/2009 | Popp |
| 2009/0160809 A1 | 6/2009 | Yang |
| 2009/0163182 A1 | 6/2009 | Gatti et al. |
| 2009/0164888 A1 | 6/2009 | Phan |
| 2009/0170480 A1 | 7/2009 | Lee |
| 2009/0205041 A1 | 8/2009 | Michalske |
| 2009/0228825 A1 | 9/2009 | Van Os et al. |
| 2009/0265662 A1 | 10/2009 | Bamford |
| 2009/0284482 A1 | 11/2009 | Chin |
| 2009/0288032 A1 | 11/2009 | Chang et al. |
| 2009/0293014 A1 | 11/2009 | Meuninck et al. |
| 2009/0298547 A1 | 12/2009 | Kim et al. |
| 2009/0307589 A1 | 12/2009 | Inose et al. |
| 2009/0307623 A1 | 12/2009 | Agarawala et al. |
| 2009/0313584 A1 | 12/2009 | Kerr et al. |
| 2009/0315847 A1 | 12/2009 | Fujii |
| 2010/0008490 A1 | 1/2010 | Gharachorloo et al. |
| 2010/0075628 A1 | 3/2010 | Ye |
| 2010/0079413 A1 | 4/2010 | Kawashima et al. |

(56) References Cited

U.S. PATENT DOCUMENTS

| | | |
|---|---|---|
| 2010/0087169 A1 | 4/2010 | Lin |
| 2010/0087173 A1 | 4/2010 | Lin |
| 2010/0100839 A1 | 4/2010 | Tseng et al. |
| 2010/0103124 A1 | 4/2010 | Kruzeniski |
| 2010/0105370 A1 | 4/2010 | Kruzeniski |
| 2010/0105424 A1 | 4/2010 | Smuga |
| 2010/0105438 A1 | 4/2010 | Wykes |
| 2010/0105439 A1 | 4/2010 | Friedman |
| 2010/0105440 A1 | 4/2010 | Kruzeniski |
| 2010/0105441 A1 | 4/2010 | Voss |
| 2010/0107067 A1 | 4/2010 | Vaisanen |
| 2010/0107068 A1 | 4/2010 | Butcher |
| 2010/0107100 A1 | 4/2010 | Schneekloth |
| 2010/0145675 A1 | 6/2010 | Lloyd et al. |
| 2010/0146437 A1 | 6/2010 | Woodcock et al. |
| 2010/0159966 A1 | 6/2010 | Friedman |
| 2010/0159994 A1 | 6/2010 | Stallings et al. |
| 2010/0159995 A1 | 6/2010 | Stallings et al. |
| 2010/0167699 A1 | 7/2010 | Sigmund et al. |
| 2010/0180233 A1 | 7/2010 | Kruzeniski |
| 2010/0216491 A1 | 8/2010 | Winkler et al. |
| 2010/0248688 A1 | 9/2010 | Teng |
| 2010/0248689 A1 | 9/2010 | Teng |
| 2010/0248741 A1 | 9/2010 | Setlur et al. |
| 2010/0248787 A1 | 9/2010 | Smuga |
| 2010/0295795 A1 | 11/2010 | Wilairat |
| 2010/0311470 A1 | 12/2010 | Seo et al. |
| 2010/0321403 A1 | 12/2010 | Inadome |
| 2011/0018806 A1 | 1/2011 | Yano |
| 2011/0055773 A1 | 3/2011 | Agarawala et al. |
| 2011/0093778 A1 | 4/2011 | Kim et al. |
| 2011/0231796 A1 | 9/2011 | Vigil |
| 2012/0050185 A1 | 3/2012 | Davydov et al. |
| 2012/0179992 A1 | 7/2012 | Smuga |
| 2012/0212495 A1 | 8/2012 | Butcher |
| 2012/0244841 A1 | 9/2012 | Teng |
| 2013/0102366 A1 | 4/2013 | Teng |
| 2014/0068446 A1 | 3/2014 | Friedman |
| 2014/0094226 A1 | 4/2014 | Friedman |
| 2014/0109005 A1 | 4/2014 | Kruzeniski |

FOREIGN PATENT DOCUMENTS

| | | |
|---|---|---|
| CN | 101228570 | 7/2008 |
| CN | 101296457 | 10/2008 |
| CN | 101308440 | 11/2008 |
| CN | 101311891 | 11/2008 |
| CN | 102197702 | 9/2011 |
| EP | 0583060 | 2/1994 |
| EP | 1752868 | 2/2007 |
| JP | H06242886 | 9/1994 |
| JP | H0897887 | 4/1996 |
| JP | 2001125913 | 5/2001 |
| JP | 2002229906 | 8/2002 |
| JP | 2004227393 | 8/2004 |
| JP | 2004357257 | 12/2004 |
| JP | 2005242661 | 9/2005 |
| JP | 2005539432 | 12/2005 |
| JP | 2006139615 | 6/2006 |
| JP | 2007141249 | 6/2007 |
| JP | 2007243275 | 9/2007 |
| JP | 2007258893 | 10/2007 |
| JP | 2008148054 | 6/2008 |
| JP | 2008217808 | 9/2008 |
| JP | 2008536196 | 9/2008 |
| JP | 2008257442 | 10/2008 |
| JP | 2009015457 | 1/2009 |
| KR | 200303655 | 2/2003 |
| KR | 20060019198 | 3/2006 |
| KR | 1020070036114 | 4/2007 |
| KR | 1020070098337 | 10/2007 |
| KR | 20070120368 | 12/2007 |
| KR | 1020080025951 | 3/2008 |
| KR | 1020080076390 | 8/2008 |
| KR | 100854333 | 9/2008 |
| KR | 20080084156 | 9/2008 |
| KR | 1020080084156 | 9/2008 |
| KR | 1020080113913 | 12/2008 |
| KR | 1020090041635 | 4/2009 |
| TW | 201023026 | 6/2010 |
| WO | WO-2005026931 | 3/2005 |
| WO | WO-2005027506 | 3/2005 |
| WO | WO-2006019639 | 2/2006 |
| WO | WO-2007030396 | 3/2007 |
| WO | WO-2007121557 | 11/2007 |
| WO | WO-2007134623 | 11/2007 |
| WO | WO-2008030608 | 3/2008 |
| WO | WO-2008030976 | 3/2008 |
| WO | WO-2008031871 | 3/2008 |
| WO | WO-2008035831 | 3/2008 |
| WO | WO-2008146784 | 12/2008 |
| WO | WO-2009000043 | 12/2008 |
| WO | WO-2009049331 | 4/2009 |
| WO | WO-2010048229 | 4/2010 |
| WO | WO-2010048448 | 4/2010 |
| WO | WO-2010048519 | 4/2010 |
| WO | WO-2010117643 | 10/2010 |
| WO | WO-2010117661 | 10/2010 |
| WO | WO-2010135155 | 11/2010 |

OTHER PUBLICATIONS

"Alltel Adds Dedicated Search Key to Phones", Retrieved from: <http://www.phonescoop.com/news/item.php?n=2159> on Nov. 26, 2008., (Apr. 12, 2007), 2 Pages.

"Apple iPhone—8GB AT&T", Retrieved from: <http://nytimes.com.com/smartphones/apple-iphone-8gb-at/4515-6452_7-32309245.html> on Nov. 20, 2008, (Jun. 29, 2007), 11 pages.

"Ask Web Hosting", Retrieved from: <http://www.askwebhosting.com/story/18501/HTC_FUZE_From_ATandampT_Fuses_Fun_and_Function_With_the_One-Touch_Power_of_TouchFLO_3D.html> on May 5, 2009., (Nov. 11, 2008), 3 pages.

"Blackberry office tools: Qwerty Convert", Retrieved from: <http://blackberrysoftwarelist.net/blackberry/download-software/blackberry-office/qwerty_convert.aspx> on Nov. 20, 2008, 1 page.

"Calc4M", Retrieved from: <http://www.hellebo.com/Calc4M.html> on Dec. 11, 2008, (Sep. 10, 2008), 4 Pages.

"Content-Centric E-Mail Message Analysis in Litigation Document Reviews", Retrieved from: <http://www.busmanagement.com/article/Issue-14/Data-Management/Content-Centric-E-Mail-Message-Analysis-in-Litigation-Document-Reviews/> on May 6, 2009, 5 Pages.

"Dial a number", Retrieved from: <http://www.phonespell.org/ialhelp.html> on Nov. 20, 2008, 1 page.

"DuoSense™ Multi-Touch Gestures", Retrieved from: <http://www.n-trig.com/Data/Uploads/Misc/DuoSenseMTG_final.pdf>, (Jul. 2008), 4 pages.

"Elecont Quick Desktop 1.0.43", Retrieved from: <http://handheld.softpedia.com/get/System-Utilities/Launcher-Applications/Elecont-Quick-Desktop-72131.shtml> on May 5, 2009., (Mar. 13, 2009), 2 pages.

"Exclusive: Windows Mobile 7 to Focus on Touch and Motion Gestures", Retrieved from: <http://anti-linux.blogspot.com/2008/08/exclusive-windows-mobile-7-to-focus-on.html> on May 6, 2009, (Aug. 1, 2008), 14 pages.

"Final Office Action", U.S. Appl. No. 12/244,545, (Dec. 7, 2011), 16 pages.

"Final Office Action", U.S. Appl. No. 12/413,977, (Nov. 17, 2011), 16 pages.

"Final Office Action", U.S. Appl. No. 12/414,476, (Dec. 1, 2011), 20 pages.

"Final Office Action", U.S. Appl. No. 12/433,667, (Sep. 13, 2011), 17 pages.

"Final Office Action", U.S. Appl. No. 12/469,458, (Nov. 17, 2011), 15 pages.

"Freeware.mobi", Retrieved from: <http://www.palmfreeware.mobi/download-palette.html> on Nov. 6, 2008, (Oct. 9, 2001), 2 pages.

"How do you dial 1-800-Flowers", Retrieved from: <http://blogs.msdn.com/windowsmobile/archive/2007/02/06/how-do-you-dial-1-800-flowers.aspx> on Nov. 20, 2008, (Feb. 6, 2007), 24 pages.

(56) References Cited

OTHER PUBLICATIONS

"HTC Shows HTC Snap with Snappy Email Feature", Retrieved from: <http://www.wirelessandmobilenews.com/smartphones/ on 5/5/09>, (May 4, 2009), 10 Pages.

"IntelliScreen-New iPhone App Shows Today Screen Type Info in Lock Screen", Retrieved from: <http://justanotheriphoneblog.com/wordpress//2008/05/13/intelliscreen-new-iphone-app-shows-today-screen-type-info-on-lock-screen/> on Nov. 12, 2008, (May 13, 2008), 11 pages.

"International Search Report", Application No. PCT/US2010/028553, Application Filing Date: Mar. 24, 2010,(Nov. 9, 2010), 9 pages.

"Internet Explorer Window Restrictions", Retrieved from: http://technet.microsoft.com/en-us/library/cc759517(WS.10).aspx on Jun. 28, 2011, Microsoft TechNet, 5 pages.

"Introduction to Windows Touch", Retrieved from: <http://download.microsoft.com/download/a/d/f/adf1347d-08dc-41a4-9084-623b1194d4b2/Win7_touch.docx>, (Dec. 18, 2008), pp. 1-7.

"Keyboard (5)", Retrieved from: <http://landru.uwaterloo.ca/cgi-bin/man.cgi?section=5&topic=keyboard> on Dec. 11, 2008., (Aug. 11,1997), 8 Pages.

"Keyboard Shortcuts", Retrieved from: <http://www.pctoday.com/editorial/article.asp?article=articles%2F2005%2Ft0311%2F26t11%2F26t11.asp> on Aug. 3, 2009., (Nov. 2005), 5 pages.

"Kiosk Browser Chrome Customization Firefox 2.x", Retrieved from: <http://stlouis-shopper.com/cgi-bin/mozdev-wiki/,pl?ChromeCustomization> on Oct. 22, 2008 Making a new chrome for the kiosk browser, Kiosk Project Kiosk Browser Chrome Customization Firefox-2.x,(Aug. 16, 2007), 2 pages.

"Live Photo Gallery—Getting Started—from Camera to Panorama", Retrieved from: <http://webdotwiz.spaces.live.com/blog/cns!2782760752B93233!1729.entry> on May 5, 2009., (Sep. 2008), 7 Pages.

"MIDTB Tip Sheet: Book Courier", Retrieved from: <http://www.midtb.org/tipsbookcourier.htm> (Sep. 26, 2005),6 Pages.

"Mobile/UI/Designs/TouchScreen", Retrieved from: <https://wiki.mozilla.org/Mobile/UI/Designs/TouchScreen> on May 6, 2009., (Feb. 3, 2009), 15 Pages.

"Multi-touch", Retrieved from <http://en.wikipedia.org/wiki/Multi-touch#Microsoft_Surface> on Apr. 24, 2009, (Apr. 17, 2009), 8 pages.

"Nokia E61 Tips and Tricks for Keyboard Shortcuts", Retrieved from: <http://www.mobiletopsoft.com/board/1810/nokia-e61-tips-and-tricks-for-keyboard-shortcuts.html> on Dec. 17, 2008., (Jan. 27, 2006), 2 Pages.

"Non-Final Office Action", U.S. Appl. No. 12/244,545, (Aug. 17, 2011), 15 pages.

"Non-Final Office Action", U.S. Appl. No. 12/413,977, (Jul. 19, 2011), 17 pages.

"Non-Final Office Action", U.S. Appl. No. 12/414,382, (Jul. 26, 2011), 9 pages.

"Non-Final Office Action", U.S. Appl. No. 12/414,434, (Aug. 2, 2011), 6 pages.

"Non-Final Office Action", U.S. Appl. No. 12/414,455, (Aug. 29, 2011), 8 pages.

"Non-Final Office Action", U.S. Appl. No. 12/414,458, (Jul. 6, 2011), 8 pages.

"Non-Final Office Action", U.S. Appl. No. 12/414,476, (Aug. 3, 2011), 21 pages.

"Non-Final Office Action", U.S. Appl. No. 12/433,605, (Jun. 24, 2011), 10 pages.

"Non-Final Office Action", U.S. Appl. No. 12/433,667, (Jun. 7, 2011), 15 pages.

"Non-Final Office Action", U.S. Appl. No. 12/469,419, (Nov. 9, 2011), 15 pages.

"Non-Final Office Action", U.S. Appl. No. 12/469,458, (Jul. 1, 2011), 15 pages.

"Non-Final Office Action", U.S. Appl. No. 12/469,480, (Sep. 22, 2011), 14 pages.

"Non-Final Office Action", U.S. Appl. No. 12/470,558, (Nov. 22, 2011), 9 pages.

"Non-Final Office Action", U.S. Appl. No. 12/484,799, (Aug. 11, 2011), 12 pages.

"Notice of Allowance", U.S. Appl. No. 12/414,458, (Oct. 31, 2011), 2 pages.

"Notice of Allowance", U.S. Appl. No. 12/414,458, (Nov. 29, 2011), 2 pages.

"Notice of Allowance", U.S. Appl. No. 12/414,458, (Aug. 10, 2011), 6 pages.

"Oracle8i Application Developers Guide—Advanced Queuing Release 2 (8.1.6)", Retrieved from: http://www.cs.otago.ac.nz/oradocs/appdev.817/a76938/adq01in5.htm on May 6, 2009., (Dec. 1999), 8 pages.

"Oracle8i Application Developer's Guide—Advanced Queuing", Retrieved from: http://www.cs.umbc.edu/help/oracle8/server.815/a68005/03_adq1i.htm on May 6, 2009., (Feb. 1999), 29 Pages.

"Oracle8i Concepts Release 8.1.5", Retrieved from: http://www.cs.umbc.edu/help/oracle8/server.815/a67781/c16queue.htm on May 6, 1009., (Feb. 1999), 10 Pages.

"Palette Extender 1.0.2", Retrieved from: <http://palette-extender.en.softonic.com/symbian> on Nov. 6, 2008, (Jan. 21, 2003), 2 pages.

"Parallax Scrolling", Retrieved from: <http://en.wikipedia.org/wiki/Parallax_scrolling> on May 5, 2009., (May 4, 2009), 3 Pages.

"PCT Search Report and Written Opinion", Application No. PCT/US2009/061382, (May 26, 2010), 10 Pages.

"PCT Search Report and Written Opinion", Application No. PCT/US2009/061735, (Jun. 7, 2010), 11 pages.

"PCT Search Report and Written Opinion", Application No. PCT/US2010/028699, (Oct. 4, 2010), 10 pages.

"PCT Search Report and Written Opinion", Application No. PCT/US2010/028555, (Oct. 12, 2010), 10 pages.

"PCT Search Report and Written Opinion", Application No. PCT/US2010/034772, (Dec. 29, 2010), 12 pages.

"PCT Search Report and Written Opinion", PCT Application No. PCT/US2010/038730, (Jan. 19, 2011) 8 pages.

"PCT Search Report", Application Serial No. PCT/US2009/061864, (May 14, 2010), 10 pages.

"Remapping the Keyboard", Retrieved from: <http://publib.boulder.ibm.com/infocenter/hodhelp/v9r0/index.jsp?topic=/com.ibm.hod9.doc/help/assignkey.html> on Dec. 11, 2008., (Jul. 15, 2005), 5 Pages.

"SecureMe-Anti-Theft Security Application for S60 3rd", Retrieved from: <http://www.killermobile.com/newsite/mobile-software/s60-applications/secureme-%11-anti%11theft-security-application-for-s60-3rd.htm> on Jun. 28, 2011, (Dec. 15, 2008), 3 pages.

"Symbian Applications", Retrieved from: <http://symbianfullversion.blogspot.com/2008_12_01_archive.html> on May 5, 2009., (Jan. 2009), 51 Pages.

"Touch Shell Free", Retrieved from: <http://www.pocketpcfreeware.mobi/download-touch-shell-free.html> on May 5, 2009., (Feb. 23, 2009), 2 Pages.

"Winterface Review", Retrieved from: <http://www.mytodayscreen.com/winterface-review> on Nov. 12, 2008, (Jul. 9, 2008), 42 pages.

"Womma", Retrieved from: <http://www.womma.org/blog/links/wom-trends/> on May 5, 2009., (2007), 70 Pages.

Dolcourt, Jessica "Webware", Retrieved from: <http://news.cnet.com/webware/?categoryId=2010> on May 5, 2009., 13 Pages.

Gade, Lisa "Samsung Alias u740" Retrieved from: <http://www.mobiletechreview.com/phones/Samsung-U740.htm> on Nov. 20, 2008, (Mar. 14, 2007), 6 pages.

Gao, Rui "A General Logging Service for Symbian based Mobile Phones", Retrieved from: <http://www.nada.kth.se/utbildning/grukth/exjobb/rapportlistor/2007/rapporter07/gao_rui_07132.pdf.> on Jul. 17, 2008, (Feb. 2007), pp. 1-42.

Ha, Rick et al., "SIMKEYS: An Efficient Keypad Configuration For Mobile Communications", Retrieved from: <http://ieeexplore.ieee.org/stamp/stamp.jsp?arnumber=01362557.> on Dec. 17, 2008, (Nov. 2004), 7 Pages.

Harrison, Richard "Symbian OS C++ for Mobile Phones vol. 3", Retrieved from: <http:// www.amazon.co.uk/Symbian-OS-Mobile-Phones-Press/dp/productdescription/0470066415> on Oct. 23, 2008, Symbian Press,(Jun. 16, 2003), 4 pages.

(56) References Cited

OTHER PUBLICATIONS

Hickey, Andrew R., "Google Android has Landed; T-Mobile, HTC Unveil G1", Retrieved from: <http://www.crn.com/retail/210603348> on Nov. 26, 2008., (Sep. 23, 2008), 4 pages.

Kcholi, Avi "Windows CE .NET Interprocess Communication", Retrieved from http://msdn.microsoft.com/en-us/library/ms836784.aspx on Jul. 17, 2008., (Jan. 2004), 15 Pages.

Mann, Richard et al., "Spectrum Analysis of Motion Parallax in a 3D Cluttered Scene and Application to Egomotion", *Journal of the Optical Society of America A*, vol. 22, No. 9 Available at <http://www.cs.uwaterloo.ca/~mannr/snow/josa-mann-langer.pdf>, (Sep. 2005), pp. 1717-1731.

Mao, Jeng "Comments of Verizon Wireless Messaging services, LLC", Retrieved from: http://www.ntia.doc.gov/osmhome/warnings/comments/verizon.htm on May 6, 2009., (Aug. 18, 2000), 5 Pages.

Mei, Tao et al., "Probabilistic Multimodality Fusion for Event Based Home Photo Clustering", Retrieved from <http://ieeexplore.ieee.org//stamp/stamp.jsp?tp=&arnumber=04036960.>, (Dec. 26, 2006), pp. 1757-1760.

Nordgren, Peder "Development of a Touch Screen Interface for Scania Interactor", *Masters Thesis in Computing Science, UMEA University*, Available at <http://www.cs.umu.se/education/examina/Rapporter/PederNordgren.pdf>,(Apr. 10, 2007), pp. 1-59.

Oliver, Sam "Potential iPhone Usability and Interface Improvements", Retrieved from: <http://www.appleinsider.com/articles/08/09/18/potential_iphone_usability_and_interface_improvements.html> Nov. 12, 2008, AppleInsider, (Sep. 18, 2008), 4 pages.

Oryl, Michael "Review: Asus P527 Smartphone for North America", Retrieved from: <http://www.mobileburn.com/review.jsp?Id=4257> on Dec. 17, 2008., (Mar. 5, 2008), 1 Page.

Padilla, Alfredo "Palm Treo 750 Cell Phone Review—Hardware", Retrieved from: <http://www.wirelessinfo.com/content/palm-Treo-750-Cell-Phone-Review/Hardware.htm> on Dec. 11, 2008., (Mar. 17, 2007), 4 Pages.

Raghaven, Gopal et al., "Model Based Estimation and Verification of Mobile Device Performance", Available at http://alumni.cs.ucsb.edu/~raimisl/emsoft04_12.pdf.,(Sep. 27-29, 2004), 10 Pages.

Reed, Brad "Microsoft Demos Windows Mobile 6.1 at CTIA", Retrieved from: <http://www.networkworld.com/news/2008/040208-ctia-microsoft-windows-mobile.html> on Jul. 18, 2008, (Apr. 2, 2008), 1 page.

Remond, Mickael "Mobile Marketing Solutions", Retrieved from: <http://www.mobilemarketingmagazine.co.uk/mobile_social_networking/> on May 5, 2009., (Apr. 28, 2009), 16 Pages.

Rice, Stephen V., et al., "A System for Searching Sound Palettes", *Proceedings of the Eleventh Biennial Symposium on Arts and Technology,*, Available at <http://www.comparisonics.com/FindSoundsPalettePaper.pdf>,(Feb. 2008), 6 pages.

Singh, Kundan et al., "CINEMA: Columbia InterNet Extensible Multimedia Architecture", Available at <http://www1.cs.columbia.edu/~library/TR-repository/reports/reports-2002/cucs-011-02.pdf>,(Sep. 3, 2002), 83 Pages.

Steinicke, Frank et al., "Mulit-Touching 2 D Data: Towards Direct Interaction in Stereoscopic Display Environments coupled with Mobile Devices", *Advanced Visual Interaction (AVI) Workshop on Designing Multi-Touch Interaction Techniques for Coupled Public*, Available at <http://viscg.uni-muenster.de/publications/2008/SHSK08/ppd-workshop.-pdf.>,(Jun. 15, 2008), 4 Pages.

Suror, "PocketShield-New Screenlock App for the HTC Diamond and Pro", Retrieved on Jun. 28, 2011, (Oct. 23, 2008), 2 pages.

Terpstra, Brett "Beta Beat: Grape, a New Way to Manage Your Desktop Clutter", Retrieved from: *Beta Beat: Grape, a New Way to Manage Your Desktop Clutter on Jun. 28, 2011*, (Apr. 14, 2009), 4 pages.

Vallerio, Keith S., et al., "Energy-Efficient Graphical User Interface Design", Retrieved from: <http://www.cc.gatech.edu/classes/AY2007/cs7470_fall/zhong-energy-efficient-user-interface.pdf>, (Jun. 10, 2004), pp. 1-13.

Wilson, Tracy V., "How the iPhone Works", Retrieved from: <http://electronics.howstuffworks.com/iphone2.htm> on Apr. 24, 2009, (Jan. 2007), 9 pages.

Yang, Seungji et al., "Semantic Photo Album Based on MPEG-4 Compatible Application Format", <http://ieeexplore.ieee.org/stamp/stamp.jsp?arnumber=04146254.>, (2007), 2 Pages.

"Advisory Action", U.S. Appl. No. 12/433,605, (Apr. 5, 2012),3 pages.

"Extended European Search Report", European Patent Application No. 09818253.8, (Apr. 10, 2012),7 pages.

"Final Office Action", U.S. Appl. No. 12/484,799, (Apr. 30, 2012),13 pages.

"Final Office Action", U.S. Appl. No. 12/560,081, (Mar. 14, 2012),16 pages.

"Non-Final Office Action", U.S. Appl. No. 12/244,545, (Mar. 27, 2012),18 pages.

"Non-Final Office Action", U.S. Appl. No. 12/414,434, (May 31, 2012),7 pages.

"Non-Final Office Action", U.S. Appl. No. 12/469,419, (May 23, 2012),13 pages.

"Notice of Allowance", U.S. Appl. No. 12/414,382, (Apr. 4, 2012),4 pages.

"Notice of Allowance", U.S. Appl. No. 12/470,558, (Apr. 2, 2012),7 pages.

Beiber, Gerald et al., "Screen Coverage: A Pen-Interaction Problem for PDA's and Touch Screen Computers", In Proceedings of ICWMC 2007,(Mar. 2007),6 pages.

Wyatt, Paul "/Flash/the art of parallax scrolling", .net Magazine,(Aug. 1, 2007),pp. 74-76.

"Final Office Action", U.S. Appl. No. 12/244,545, (Sep. 7, 2012),23 pages.

"Non-Final Office Action", U.S. Appl. No. 12/413,977, (Jul. 20, 2012),18 pages.

"Non-Final Office Action", U.S. Appl. No. 12/480,969, (Aug. 7, 2012),15 pages.

"Non-Final Office Action", U.S. Appl. No. 12/484,799, (Aug. 7, 2012),13 pages.

"Notice of Allowance", U.S. Appl. No. 12/414,434, (Aug. 17, 2012),4 pages.

"Notice of Allowance", U.S. Appl. No. 12/470,558, (Aug. 23, 2012),2 pages.

"Notice of Allowance", U.S. Appl. No. 12/484,845, (Mar. 16, 2012),5 pages.

"Final Office Action", U.S. Appl. No. 12/480,969, (Nov. 23, 2012), 18 pages.

"Non-Final Office Action", U.S. Appl. No. 12/414,476, (Nov. 9, 2012), 22 pages.

"Non-Final Office Action", U.S. Appl. No. 12/469,458, (Sep. 21, 2012), 14 pages.

"Non-Final Office Action", U.S. Appl. No. 12/469,480, (Oct. 17, 2012), 16 pages.

"Non-Final Office Action", U.S. Appl. No. 13/492,495, (Sep. 17, 2012), 8 pages.

"Notice of Allowance", U.S. Appl. No. 12/469,419, (Nov. 27, 2012), 13 pages.

"Notice of Allowance", U.S. Appl. No. 12/484,799, (Oct. 22, 2012), 10 pages.

"Final Office Action", U.S. Appl. No. 12/433,605, (Jul. 17, 2013),13 pages.

"Final Office Action", U.S. Appl. No. 12/480,969, (Jul. 24, 2013),19 pages.

"Foreign Office Action", Chilean Application No. 2379-2011, (Jul. 3, 2013), 8 pages.

"Foreign Office Action", Chinese Application No. 200980139831.4, (Jul. 1, 2013), 11 pages.

"Foreign Office Action", Chinese Application No. 200980142632.9, (Jun. 14, 2013), 6 pages.

"Foreign Office Action", Chinese Application No. 201080015788.3, (Jun. 15, 2013), 12 Pages.

"Foreign Office Action", Chinese Application No. 201080023212.1, (Jun. 5, 2013), 8 pages.

"Foreign Office Action", Japanese Application No. 2012-503523, (Ar. 22, 2013), 5 Pages.

(56) References Cited

OTHER PUBLICATIONS

"Notice of Allowance", U.S. Appl. No. 12/433,667, (Jun. 25, 2013),14 pages.
"Supplemental Notice of Allowance", U.S. Appl. No. 12/433,667, (Aug. 1, 2013),2 pages.
"Final Office Action", U.S. Appl. No. 12/414,476, (Apr. 8, 2013),25 pages.
"Final Office Action", U.S. Appl. No. 12/469,480, (Apr. 10, 2013), 21 pages.
"Foreign Office Action", Chinese Application No. 200980142644.1, (Apr. 3, 2013), 10 pages.
"Foreign Office Action", Chinese Application No. 201080015728.1, (May 16, 2013), 10 pages.
"Introducing Application Styling for Windows Forms", *Infragistics Software Manual*, Version 7.3.20073.1043, (Nov. 2007), 95 pages.
"Non-Final Office Action", U.S. Appl. No. 12/469,458, (May 3, 2013), 21 pages.
"Non-Final Office Action", U.S. Appl. No. 12/480,969, (Apr. 4, 2013), 22 pages.
"Notice of Allowance", U.S. Appl. No. 13/492,495, (Apr. 26, 2013), 5 pages.
"Advisory Action", U.S. Appl. No. 12/414,382, (Jan. 20, 2012), 3 pages.
"Final Office Action", U.S. Appl. No. 12/414,382, (Dec. 23, 2011), 7 pages.
"Final Office Action", U.S. Appl. No. 12/433,605, (Feb. 3, 2012), 11 pages.
"Final Office Action", U.S. Appl. No. 12/469,480, (Feb. 9, 2012), 17 pages.
"Non-Final Office Action", U.S. Appl. No. 12/414,434, (Jan. 17, 2012), 7 pages.
"Non-Final Office Action", U.S. Appl. No. 12/433,667, (Feb. 3, 2012), 16 pages.
"Non-Final Office Action", U.S. Appl. No. 12/484,845, (Dec. 7, 2011), 16 pages.
"Non-Final Office Action", U.S. Appl. No. 12/560,081, (Dec. 7, 2011), 16 pages.
"Notice of Allowance", U.S. Appl. No. 12/414,455, (Jan. 4, 2012),4 pages.
La, Nick "Parallax Gallery", Available at <http://webdesignerwall.comtutorials/parallax-gallery/comment-page-1>,(Apr. 25, 2008), 16 pages.
Roberts, Neil "Touching and Gesturing on the iPhone", Available at <http://www.sitepen.com/blog/2008/07/10/touching-and-gesturing-on-the-iphone/comments-pare-1>,(Jul. 10, 2008), 16 pages.
"Extended European Search Report", European Patent Application No. 09822736.6, (Dec. 18, 2012), 7 pages.
"Final Office Action", U.S. Appl. No. 12/433,667, (Jan. 7, 2013), 17 pages.
"Final Office Action", U.S. Appl. No. 12/469,458, (Feb. 1, 2013), 19 pages.
"Foreign Office Action", Chinese Application No. 200980142632.9, (Jan. 29, 2013), 11 pages.
"Foreign Office Action", Chinese Application No. 200980142661.5, (Jan. 21, 2013), 12 pages.
"Foreign Office Action", Chinese Application No. 201080015728.1, (Dec. 26, 2012), 9 pages.
"Foreign Office Action", Chinese Application No. 201080015788.3, (Dec. 24, 2012), 10 pages.
"Foreign Office Action", Chinese Application No. 201080023212.1, (Dec. 5, 2012), 10 pages.
"Non-Final Office Action", U.S. Appl. No. 12/433,605, (Jan. 11, 2013), 7 pages.
"Non-Final Office Action", U.S. Appl. No. 13/492,495, (Dec. 19, 2012), 6 pages.
Crouch, Dennis "Smartphone Wars: Micron's Slide-to-Unlock Patent", (Jan. 30, 2013), 2 pages.
"Final Office Action", U.S. Appl. No. 12/469,458, (Oct. 11, 2013), 24 pages.
"Foreign Office Action", Chinese Application No. 201080015802.X, (Sep. 29, 2013), 11 Pages.
"Foreign Office Action", Japanese Application No. 2011-530109, (Jul. 18, 2013), 4 Pages.
"Non-Final Office Action", U.S. Appl. No. 13/418,884, (Sep. 30, 2013), 7 pages.
"Supplemental Notice of Allowance", U.S. Appl. No. 12/433,667, (Oct. 10, 2013), 2 pages.
"Non-Final Office Action", U.S. Appl. No. 12/433,605, Nov. 6, 2013, 16 pages.
"Non-Final Office Action", U.S. Appl. No. 12/414,476, Oct. 25, 2013, 18 pages.
"Non-Final Office Action", U.S. Appl. No. 12/480,969, Oct. 29, 2013, 22 pages.
"Non-Final Office Action", U.S. Appl. No. 12/244,545, Dec. 19, 2013, 22 pages.
"Final Office Action", U.S. Appl. No. 12/469,480, Dec. 5, 2013, 24 pages.
"Foreign Office Action", Mexican Application No. MX/a/2011/012279, Jul. 4, 2013, 3 Pages.
"Foreign Office Action", JP Application No. 2012-503515, Nov. 18, 2013, 5 Pages.
"Foreign Office Action", JP Application No. 2012-503514, Aug. 7, 2013, 5 pages.
"Foreign Office Action", Chinese Application No. 201080015728.1, Oct. 29, 2013, 8 Pages.
"Final Office Action", U.S. Appl. No. 13/418,884, Dec. 30, 2013, 8 pages.
"Final Office Action", U.S. Appl. No. 12/244,545, May 6, 2014, 24 pages.
"Floating Layer", Retrieved from <http://web.archive.org/web/20011025040032/http://www.echoecho.com/toolfloatinglayer.htm> on Apr. 15, 2014, Oct. 25, 2001, 9 pages.
"Foreign Office Action", AU Application No. 2010260165, Mar. 25, 2014, 3 Pages.
"Foreign Office Action", AU Application No. 2010260165, May 1, 2014, 3 Pages.
"Foreign Office Action", CN Application No. 201080015802.X, May 19, 2014, 7 Pages.
"Foreign Office Action", JP Application No. 2011-530109, May 2, 2014, 4 Pages.
"Foreign Office Action", JP Application No. 2012-516218, Mar. 6, 2014, 6 Pages.
"Non-Final Office Action", U.S. Appl. No. 12/560,081, Apr. 30, 2014, 25 pages.
"Notice of Allowance", U.S. Appl. No. 12/433,605, Apr. 25, 2014, 4 pages.
"Final Office Action", U.S. Appl. No. 12/414,476, Apr. 24, 2014, 19 pages.
"Foreign Office Action", AU Application No. 2010234909, Mar. 17, 2014, 4 Pages.
"Foreign Office Action", CN Application No. 200980139831.4, Mar. 24, 2014, 9 Pages.
"Foreign Office Action", CN Application No. 200980142644.1, Mar. 5, 2014, 7 Pages.
"Foreign Office Action", JP Application No. 2012-511905, Jan. 28, 2014, 6 Pages.
"Foreign Office Action", RU Application No. 2011147058, Feb. 12, 2014, 7 Pages.
"Non-Final Office Action", U.S. Appl. No. 13/418,884, Mar. 10, 2014, 8 pages.
"Non-Final Office Action", U.S. Appl. No. 13/712,777, Mar. 20, 2014, 7 pages.

\* cited by examiner

ALTERNATIVE INPUTS OF A MOBILE COMMUNICATIONS DEVICE

RELATED APPLICATIONS

This application claims priority under 35 U.S.C. Section 120 as a continuation of U.S. patent application Ser. No. 12/414,458, filed Mar. 30, 2009, which claims priority under 35 U.S.C. Section 119(e) to U.S. Provisional Patent Applications Nos. 61/107,945, 61/107,935, and 61/107,921, each of which was filed on Oct. 23, 2008, the entire disclosures of each of the applications are hereby incorporated by reference in their entirety.

BACKGROUND

Mobile communication devices (e.g., wireless phones) have become an integral part of everyday life. For example, a user traditionally used a mobile communications device to place and receive telephone calls when the user was away from a fixed communications device, e.g., a house or office wired telephone. In some instances, the mobile communications device became the primary device via which the user communicated with other users as the user became accustomed to the convenience and functionality of the device.

Communication techniques that may be employed using a mobile communications device have also increased. For example, users were traditionally limited to telephone calls between mobile communications devices. Advances were then made to provide a variety of other communication techniques, e.g., text messaging and email. However, inclusion of these additional communication techniques on mobile communications devices having traditional form factors may cause these devices to become unwieldy and less suitable for mobile applications. For example, traditional input devices that were employed by these communication techniques may be less suitable when applied by traditional mobile communications devices.

SUMMARY

Alternative inputs of a mobile communications device are described. In an implementation, a mobile communications device includes a display device having touchscreen functionality, a keyboard having a plurality of physical keys that include a dedicated key and letter keys arranged according to a QWERTY layout, and one or more modules. The one or more modules are configured to output a user interface on the display device responsive to selection of the dedicated key, the user interface having a plurality of portions that are selectable via the touchscreen functionality to cause input of a respective one of a plurality of emoticons.

In an implementation, a determination is made that a physical letter key of a keyboard of a mobile communications device has been selected. If the physical letter key has not been selected for a specified amount of time, a letter is input that corresponds to the physical letter key. If the physical letter key has been selected for a specified amount of time, an alternative input is displayed that includes the letter on the mobile communications device, the display of the alternative input being selectable to cause input of the alternative input.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different instances in the description and the figures may indicate similar or identical items.

DETAILED DESCRIPTION

Overview

Figure 1:
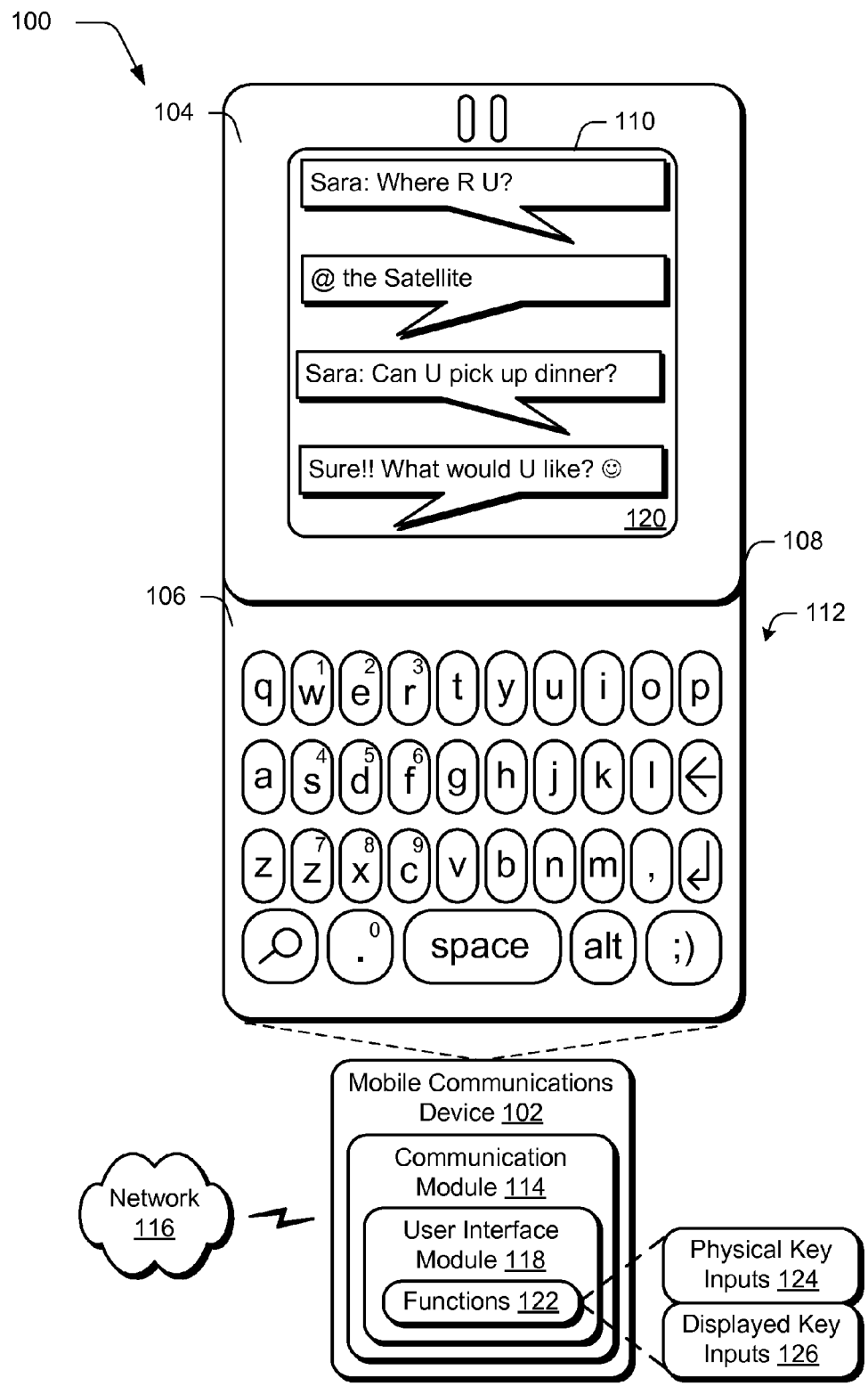
FIG. 1 is an illustration of an example implementation of a mobile communications device in accordance with one or more embodiments of devices, features, and systems for mobile communications.

Users continually desire increased functionality from mobile communications devices, e.g., gaming devices, wireless phones, mobile messaging devices, calendaring devices, and so on. For example, users may maintain a calendar, a list of contacts, send and receive text messages, access the Internet, send and receive email, take pictures, send status message (i.e., status update) of a social network, and so on. However, interaction with this increased functionality in conventional mobile communications devices may be difficult due to traditional form factors that were employed to keep the device "portable", which traditionally resulted in small keys that were difficult to use and/or a large form factor that became less and less portable in order to provide sufficient space for each of the keys of a keyboard.

For example, "QWERTY" keypads on a mobile communications device have a limited amount of space for each of the keys on a standard keyboard, such as keyboard used in a desktop environment to enter Latin characters. As a result, the size of keys and/or the amount of keys included on the device are limited and are typically balanced, e.g., a number of keys and a desired size of the keys.

Consequently traditional manufacturers of QWERTY mobile communications devices (e.g., wireless phones) may load secondary and tertiary functions on a signification portion of the keys, e.g., a majority of the keys. For example, with three functions per key the already small keys may include up to three indicia (e.g., legends) on them to describe each function. Accordingly, loading of the physical keys with secondary and tertiary functions may make the overall keyboard look complex. As such, QWERTY keyboards on traditional mobile communications devices were often considered to be targeted for business and not consumer use. Additionally, inclusion of extended functions on each key may make it harder to find a desired key function, e.g., the desired key function may be buried in a sea of key functions that are not used as much by the user.

In one or more implementations, functionality of a physical keyboard (e.g., a QWERTY keyboard) is combined with a display device (e.g., a touchscreen) to offload alternate functions for input (i.e., alternative inputs) from the physical keypad onto the display device. For example, a dedicated hardware key may be used to load a library of secondary and tertiary functions for display on the display device. For instance, a key labeled with a punctuation smiley face ";)" may be used to load punctuation marks and/or emoticons. Thus, the physical keyboard may be simplified to include primary functions and secondary functions used most often to make these functions easy to access and use from day to day, thereby making a keyboard having increased acceptability in the consumer space.

Additionally, these techniques may be leveraged to increase flexibility of the mobile communications device to provide special characters (e.g., as secondary and/or tertiary functions) for specific localization. For example, characters may be identified that commonly utilized in a specific geographic location. Rather than reconfigure the physical keyboard, these characters may be output for selection by leveraging touch screen functionality of the mobile communications device. Further discussion of leveraging a display device for input of secondary and tertiary functions that are not present on a physical keyboard may be found in relation to FIGS. 2, 3, and 5.

In an implementation, at least one physical key of a keyboard of a mobile communications device is configured to be selectable to load additional functions for that physical key which may or may not be indicated on the physical key. For example, a user may press and hold a key and have accents associated with that key loaded automatically as an extended set of that physical key. In Spanish, for instance, the tilde "~" might be used in conjunction with a letter Ñ in the word SEÑIOR. In order to load the tilde, a user may press and hold the "N" on the keypad to load an extended set of N's with accents on the display device. A user may then select from the extended set, e.g., using a touchscreen or other cursor control device. Thus, clutter on the keyboard of indications of the multiple functions may be reduced yet still make that functionality available to a user. A variety of other examples are also contemplated, further discussion of which may be found in relation to FIGS. 4 and 6.

In the following discussion, a variety of example implementations of a mobile communications device (e.g., a wireless phone) are described. Additionally, a variety of different functionality that may be employed by the mobile communications device is described for each example, which may be implemented in that example as well as in other described examples. Accordingly, example implementations are illustrated of a few of a variety of contemplated implementations. Further, although a mobile communications device having one or more modules that are configured to provide telephonic functionality are described, a variety of other mobile devices are also contemplated, such as personal digital assistants, mobile music players, dedicated messaging devices, portable game devices, and so on.

Example Implementations

FIG. 1 is an illustration of an example implementation 100 of a mobile communications device 102 in accordance with one or more embodiments of devices, features, and systems for mobile communications. The mobile communications device 102 is operable to assume a plurality of configurations, examples of which include a configuration in which the device is "closed" and a configuration illustrated in FIG. 1 in which the device is "open."

The mobile communications device 102 is further illustrated as including a first housing 104 and a second housing 106 that are connected via a slide 108 such that the first and second housings 104, 106 may move (e.g., slide) in relation to one another. Although sliding is described, it should be readily apparent that a variety of other movement techniques are also contemplated, e.g., a pivot, a hinge and so on.

The first housing 104 includes a display device 110 that may be used to output a variety of data, such as a caller identification (ID), information related to text messages as illustrated, email, multimedia messages, Internet browsing, game play, music, video and so on. In the illustrated implementation, the display device 110 is also configured to function as an input device by incorporating touchscreen functionality, e.g., through capacitive, surface acoustic wave, resistive, optical, strain gauge, dispersive signals, acoustic pulse, and other touchscreen functionality.

The second housing 106 is illustrated as including a keyboard 112 that may be used to provide inputs to the mobile communications device 102. Although the keyboard 112 is illustrated as a QWERTY keyboard, a variety of other examples are also contemplated, such as a keyboard that follows a traditional telephone keypad layout (e.g., a twelve key numeric pad found on basic telephones), keyboards configured for other languages (e.g., Cyrillic) and so on.

In the example shown in FIG. 1, the first and second housings 104, 106 of the mobile communications device 102 are approximately squared. For example, a plane defined by an outer surface of the display device 114 may be parallel to a plane of the first housing 104 that approximates a square, which may be the same as or different from the plane defined by the display device 110. In other words, the width and height of the plane taken from the first housing 104 that is parallel to the other surface of the display device 110 is approximately one-to-one. Likewise, the second housing 106 may be considered square along a plane that is parallel to and/or is the same as an outer surface of the keyboard 112 disposed within the second housing 106.

The mobile communications device 102 may assume a "closed configuration" such that the first housing 104 covers the second housing 106 by sliding the housing together using the slide 108. Consequently, the keyboard 112 disposed on the second housing 106 may be covered and made not available to for interaction by a user of the mobile communications device 102. In an implementation, telephonic functionality is still available when the mobile communications device 102 is in the closed configuration, e.g., to receive a telephone call.

In the "open" configuration as illustrated in the example implementation 100 of FIG. 1, the first housing 104 is moved (e.g., slid) "away" from the second housing 106 using the slide 108. In this example configuration, at least a majority of the keys of the keyboard 112 is exposed such that the exposed keys are available for use to provide inputs. The open configuration results in an extended form factor of the mobile communications device 102 as contrasted with the form factor of the mobile communications device 102 in the closed configuration. In an implementation, the planes of the first and second housings 104, 106 that are used to define the extended form factor are parallel to each other, although other implementations are also contemplated.

The form factor employed by the mobile communications device 102 may be suitable to support a wide variety of features. For example, the keyboard 112 is illustrated as supporting a QWERTY configuration. This form factor may be particularly convenient to a user to utilize the previously described functionality of the mobile communications device 102, such as to compose texts, play games, check email, "surf" the Internet, provide status messages for a social network, and so on.

In the mobile communications device 102 of FIG. 1, a portion of the keys of the keyboard 112 are illustrated as sharing multiple functions. For example, a numeric keypad may be provided within physical keys of the QWERTY layout as illustrated by the physical keys "w", "e", "r", "s", "d", "f", "z", "x", "c", and "." as sharing numbers "1", "2", "3", "4", "5", "6", "7", "8", "9", and "0", respectively. The numbers may be accessed by pressing the "ALT" key of the keypad 112. A variety of other examples are also contemplated, an example of which may be found in relation to the following figure.

The mobile communications device 102 is also illustrated as including a communication module 114. The communication module 114 is representative of functionality of the mobile communications device 102 to communicate via a network 116. For example, the communication module 114 may include telephone functionality to make and receive telephone calls. The communication module 114 may also include a variety of other functionality, such as to form short message service (SMS) text messages, multimedia messaging service (MMS) messages, emails, status messages for a social network, and so on. For instance, a user may form a status message for communication via the network 116 to a social network website. The social network website may then publish the status message to "friends" of the user, e.g., for receipt by the friends via a computer, respective mobile communications device, and so on. A variety of other examples are also contemplated, such as blogging, instant messaging, and so on.

The communication module 114 is further illustrated as including a user interface module 118 that is representative of functionality of the mobile communications device 102 to generate, output, and manage a user interface 120 on the display device 110. For example, the user interface 120 is illustrated in FIG. 1 as being configured for SMS text messaging and follows a conversation between a user of the mobile communications device 102 and another user of another mobile communications device via the network 116.

As previously described, conventional loading of the physical keys of a keyboard with secondary and tertiary functions may make the overall keyboard look complex. Additionally, inclusion of indicia of alternative functions on each physical key may make it harder to find a desired key function, e.g., the desired key function may be buried in a sea of key functions. Accordingly, the user interface module 118 may separate functions 122, such as to make a portion of the functions 122 available via physical key inputs 124 and alternate functions available via displayed key inputs 126. In this way, the user interface module 118 may leverage the user interface 120 to provide alternative inputs without cluttering the keyboard 112, further discussion of which may be found in relation to the following figures.

Generally, any of the functions described herein can be implemented using software, firmware, hardware (e.g., fixed logic circuitry), manual processing, or a combination of these implementations. The terms "module," "functionality," and "logic" as used herein generally represent software, firmware, hardware or a combination of software and firmware. In the case of a software implementation, the module, functionality, or logic represents instructions (e.g., program code) that perform specified tasks when executed on a computing system formed by one or more computers having one or more processors (e.g., CPU or CPUs). The instructions may be stored in one or more tangible computer readable memory devices. The features of the alternative input techniques described below are platform-independent, meaning that the techniques may be implemented on a variety of commercial computing platforms having a variety of processors.

Figure 2:
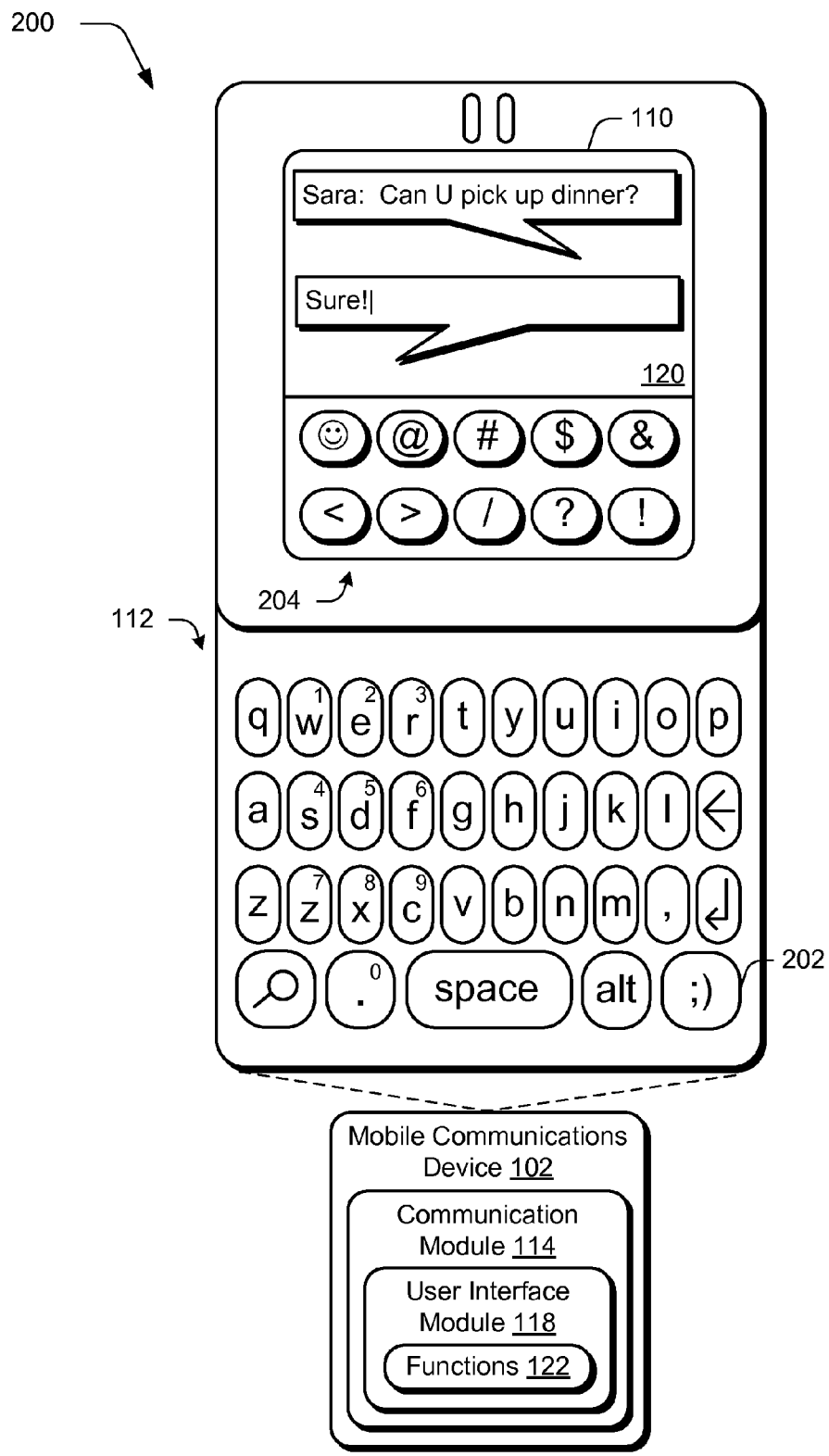
FIG. 2 illustrates an example implementation in which the mobile communications device of FIG. 1 outputs a user interface configured to leverage functionality of a display device for input of alternative functions.

FIG. 2 illustrates an example implementation 200 in which the mobile communications device 102 of FIG. 1 outputs a user interface configured to leverage functionality of the display device for input of alternate functions. The keyboard 112 includes a plurality of physical keys which include letter keys arranged according to a QWERTY layout as previously described.

A subset of the physical keys of the keyboard 112 includes indicia of both letters and numbers that may be entered using that key. For example, the physical keys "w", "e", "r", "s", "d", "f", "z", "x", "c", and "." are illustrated as sharing numbers "1", "2", "3", "4", "5", "6", "7", "8", "9", and "0", respectively. The numbers may input in a variety of ways, such as by pressing an ALT key concurrently with one or more of the keys in the subset. For example, the number "1" may be input by pressing the ALT key and the "w" key that also has indicia of the number "1" marked thereon. Thus, in this example a user may readily provide an input of letters or numbers by interacting directly and exclusively with the keyboard 112.

In the illustrated example, the mobile communications device 102 may be configured to "offload" alternative inputs to the display device 110 for input. For example, a user may select a dedicated physical key 202 (illustrated as including an emoticon formed using punctuation marks) to cause a plurality of portions 204 to be displayed in the user interface 120 to provide alternative inputs. The alternative inputs in the illustrated example include non-alphanumeric characters such as punctuation marks and emoticons. Punctuation marks are symbols other than letters or number used in written language (e.g., ";"). Emoticons represent facial expressions, such as through the use of punctuation marks, e.g., ":)", punctuation marks and letters, e.g., ":p", without punctuation marks, e.g., "☺", and so on.

The portions 204 are illustrated as buttons in this example that may be selected using touchscreen functionality of the display device. For instance, the portions 204 in FIG. 2 include punctuation keys that may be selected to cause a respective input by pressing a finger against the display device 110, using a stylus, and so on. Although touchscreen functionality has been described, a variety of other functionality may also be employed to select functions displayed on the display device 110, such as a cursor control device.

In the illustrated example, the user interface module 118 leverages the display device 110 to "offload" alternative inputs that include punctuation marks via respective punctuation keys, example of which include "@" "#," "$," "&," "<," ">," "/," "?," and "!." The user interface 120 also includes a key that as displayed includes an emoticon "☺." In one example, the display of the key in the user interface 120 may be selected to cause output of the emoticon directly, e.g., by pressing the display device to use touchscreen functionality. In another example, the key may be selected to access a sub-menu having a plurality of emoticons, further discussion of which may be found in relation to the following figure.

Figure 3:
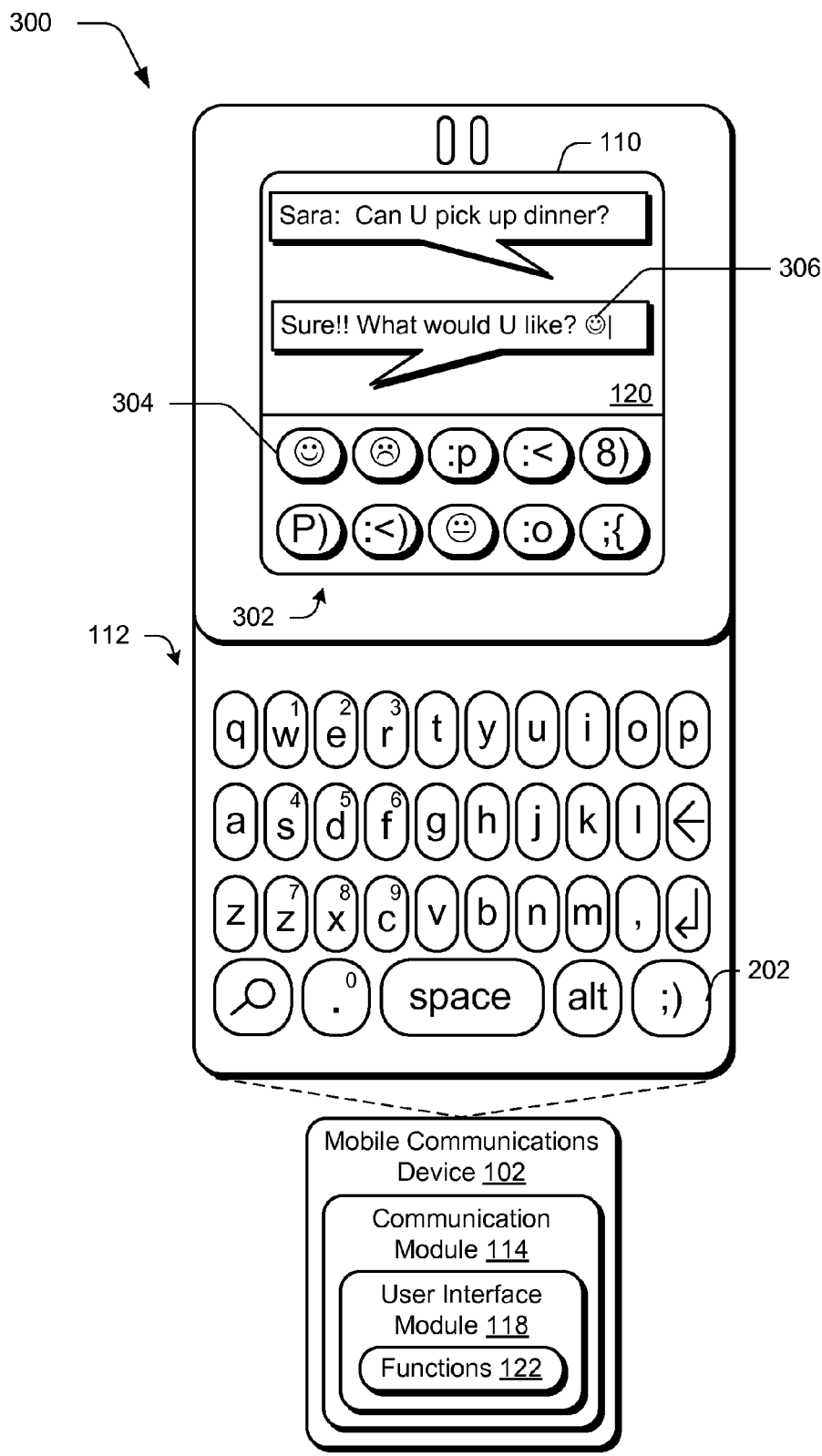
FIG. 3 illustrates an example implementation in which a user interface is configured to provide alternative inputs of a plurality of emoticons, the user interface being output in response to interaction with the user interface of FIG. 2.

FIG. 3 illustrates an example implementation 300 in which a user interface is configured to provide alternative inputs of a plurality of emoticons, the user interface being output in response to interaction with the user interface 120 of FIG. 2. The user interface 120 in this example includes a plurality of portions, each having a respective emoticon that is selectable to cause the respective emoticon to be input. For example, the display of the button 304 having the emoticon "☺" is illustrated as providing an input of "☺" 306 in a SMS text message.

Although the user interface 120 having portions 304 that are selectable to input emoticons was described as a submenu that is accessible via the punctuation menu of FIG. 2, a wide variety of other examples are also contemplated. For instance, the physical key 202 having the emoticon may be selected to cause output of the emoticon library directly. In this instance, another physical key may be dedicated to punctuation marks such that selection of this other physical key may cause the illustrated punctuation library of FIG. 2 to be output directly.

Thus, as described in FIGS. 2-3, functionality of physical keys of a keyboard 112 (e.g., a QWERTY keyboard) may be combined with the display device 110 (e.g., a touchscreen) to offload selected secondary and tertiary functions from the keyboard 112 onto the display device 110. Thus, the physical keyboard 112 may be simplified to include primary functions and secondary functions that are used most often to make these functions easy to access and use from day to day. Although a few examples of offloaded functions are described, it should be readily apparent that a variety of different functions may be offloaded without departing from the spirit and scope thereof, further discussion of which may be found in relation to the following figure.

Figure 4:
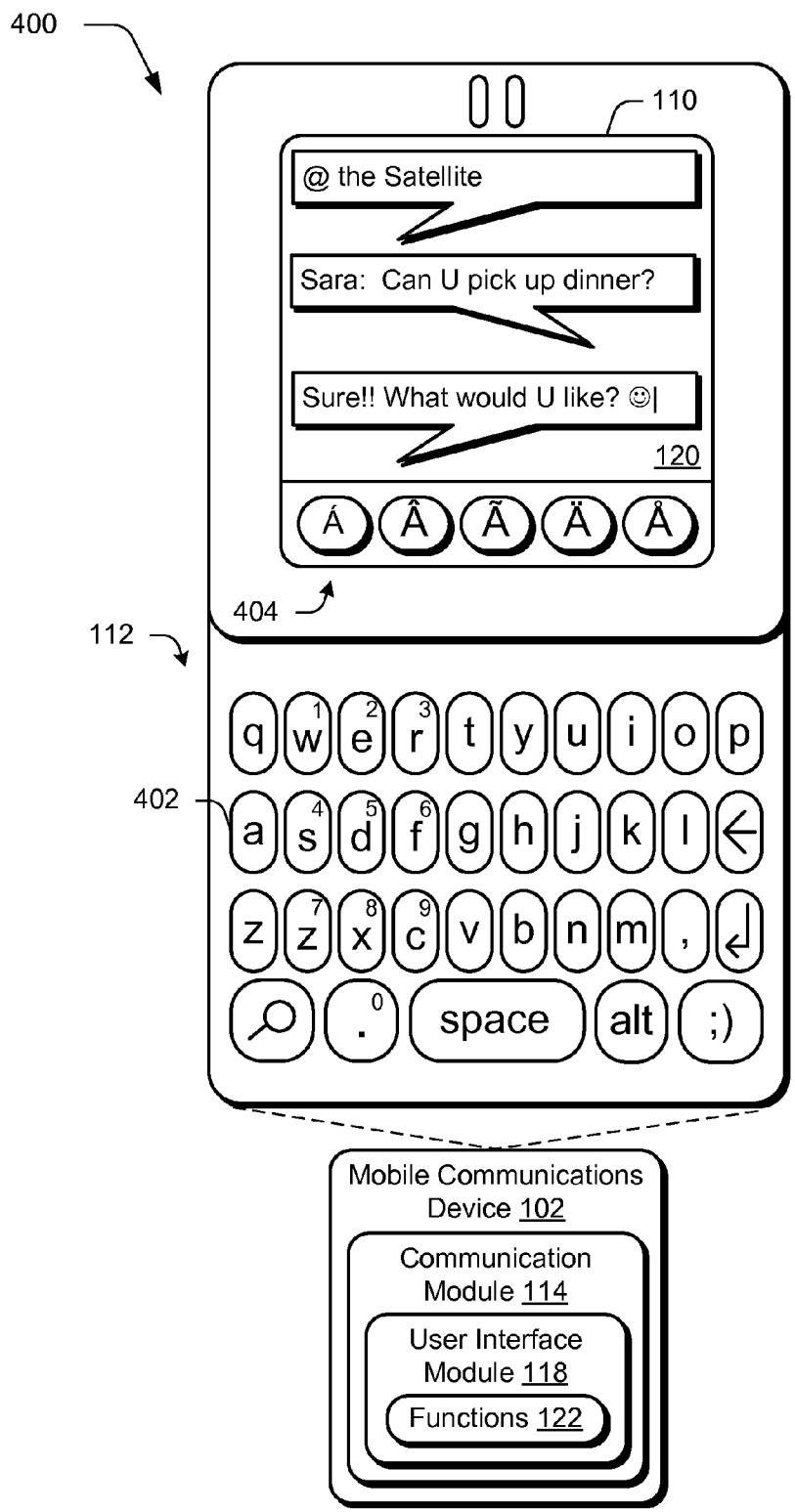
FIG. 4 illustrates an example implementation in which alternative inputs are displayed on a display device responsive to selection of a physical key of the mobile communications device of FIG. 1 that relate to a primary function of the physical key.

FIG. 4 illustrates an example implementation 400 in which alternative inputs are displayed on a display device responsive to selection of a physical key of the mobile communications device 102 of FIG. 1 that relate to a primary function of the physical key. For example, a physical key 402 of the keyboard 112 includes indicia indicating a letter "a". Therefore, the primary function of the physical key 402 is to enter the letter "a" when selected by a user without being selected in combination with another physical key, e.g., the ALT key.

In an implementation, the user interface module 118 may be configured such that alternative inputs are displayed that relate to a particular physical key if the physical key is selected for a specified amount of time. For example, the user may "hold down" the physical key 402 for two seconds, which may cause the user interface module 118 to display alternative inputs 404 that relate to the primary function of the physical key 402 in the user interface 120. In the illustrated instance, the relationship between the primary function and the alternative inputs is that the alternative inputs include a letter that is the primary function, which is shown through different combinations of the letter "a" with symbols that represent accents to be applied to the letter "a".

In another example, a user may press and hold a key and have accents associated with that key loaded automatically as an extended set of that physical key. In Spanish, for instance, the tilde "~" might be used in conjunction with a letter Ñ in the word "SEÑIOR." In order to load the tilde, a user may press and hold the "N" on the keypad to load an extended set of N's with accents on the display device 110. A user may then select from the extended set, e.g., using a touchscreen or other cursor control device. Thus, clutter on the keyboard 112 of indications of the multiple functions may be reduced yet still make that functionality available to a user. A variety of other examples are also contemplated, further discussion of which may be found in relation to FIG. 6.

Example Procedures

The following discussion describes alternative input techniques that may be implemented utilizing the previously described systems and devices. Aspects of each of the procedures may be implemented in hardware, firmware, or software, or a combination thereof. The procedures are shown as a set of blocks that specify operations performed by one or more devices and are not necessarily limited to the orders shown for performing the operations by the respective blocks. In portions of the following discussion, reference will be made to the environment 100 of FIG. 1 and the implementations 200, 300, 400 of FIGS. 2-4, respectively.

Figure 5:
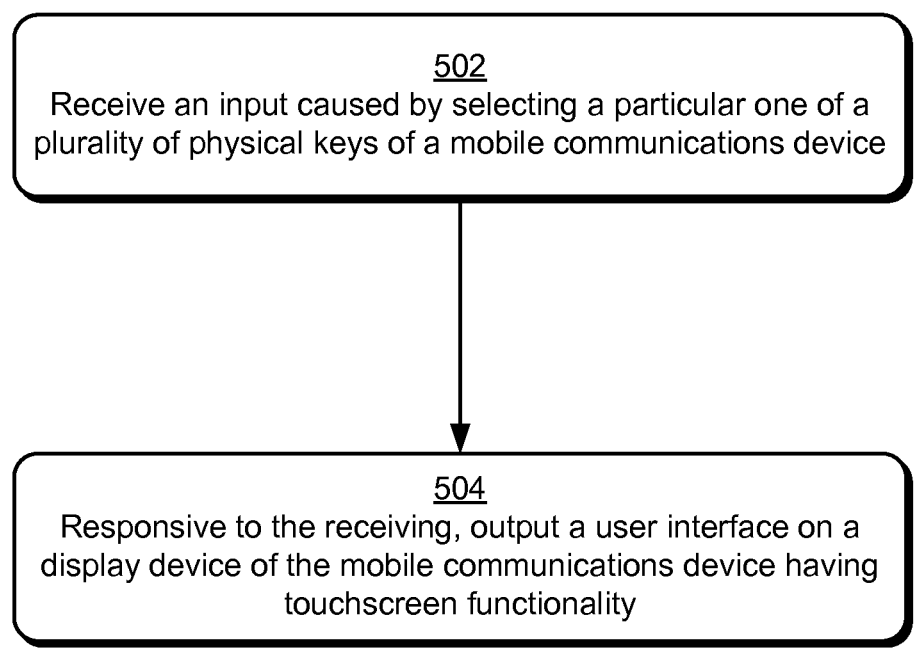
FIG. 5 is a flow diagram depicting a procedure in an example implementation in which a user interface is output to display alternative inputs.

FIG. 5 depicts a procedure 500 in an example implementation in which a user interface is output to display alternative inputs. An input is received that is caused by selecting a particular one of a plurality of physical keys of a mobile communications device (block 502).

Responsive to the receiving, a user interface is output on a display device of the mobile communication device having touchscreen functionality (block 504). The user interface includes a plurality of punctuation keys, each being selectable via the touchscreen functionality to cause input of a respective one of a plurality of punctuation marks. At least one key is displayed in the user interface and is selectable via the touchscreen functionality to cause a plurality of emoticon keys to be output in the user interface. Each of the emoticon keys are selectable to cause input of a respective one of a plurality of emoticons. As previously described emoticons may be configured to convey emotions, such as by mimicking facial expressions.

Figure 6:
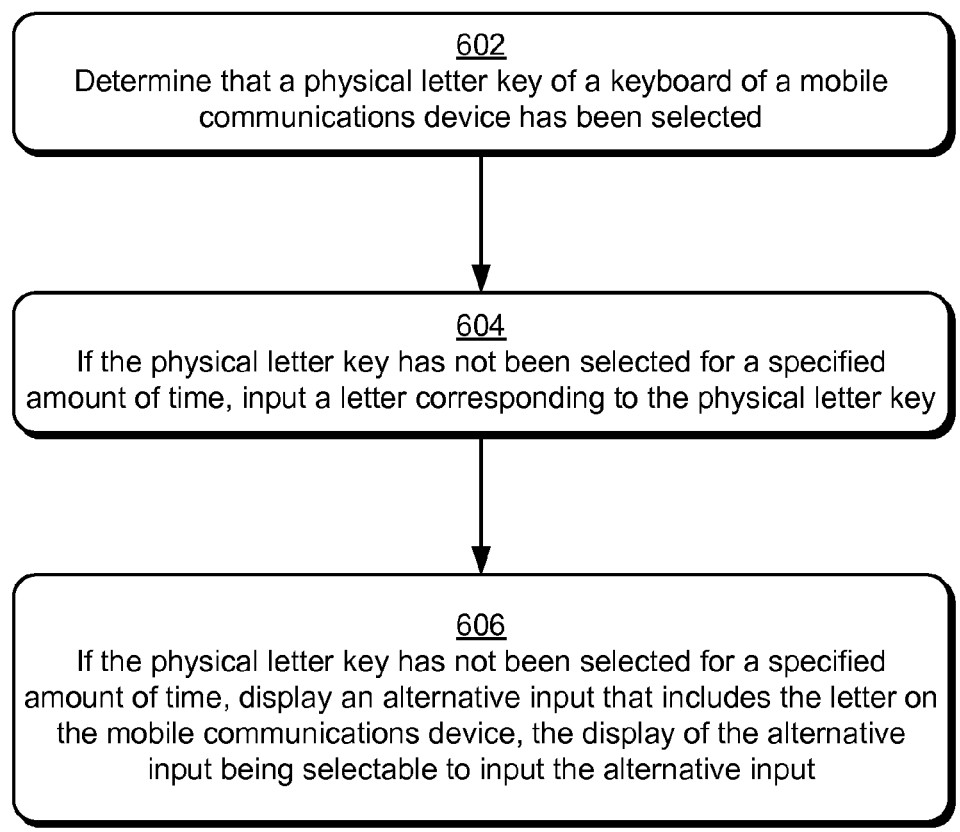
FIG. 6 is a flow diagram depicting a procedure in an example implementation in which alternative inputs are output in a user interface that correspond to a letter of a physical letter key.

FIG. 6 depicts a procedure 600 in an example implementation in which alternative inputs are output in a user interface that correspond to a letter of a physical letter key. A determination is made that a physical letter key of a keyboard of a mobile communications device has been selected (block 602). For example, the physical key 402 "a" of FIG. 4 may be configured to provide a primary input of a letter "a" and therefore may be referenced as a physical letter key.

If the physical letter key has not been selected for a specified amount of time a letter is input that corresponds to the physical letter key (block 604), such as a letter "a" for the physical key 402 in the previous example.

If the physical letter key has not been selected for a specified amount of time, an alternative input is displayed that includes the letter on the mobile communications device, the display of the alternative input being selectable to input the alternative input (block 606), such as to include one or more accents with the letter in the user interface 120. A variety of other examples are also contemplated.

Example Device

Figure 7:
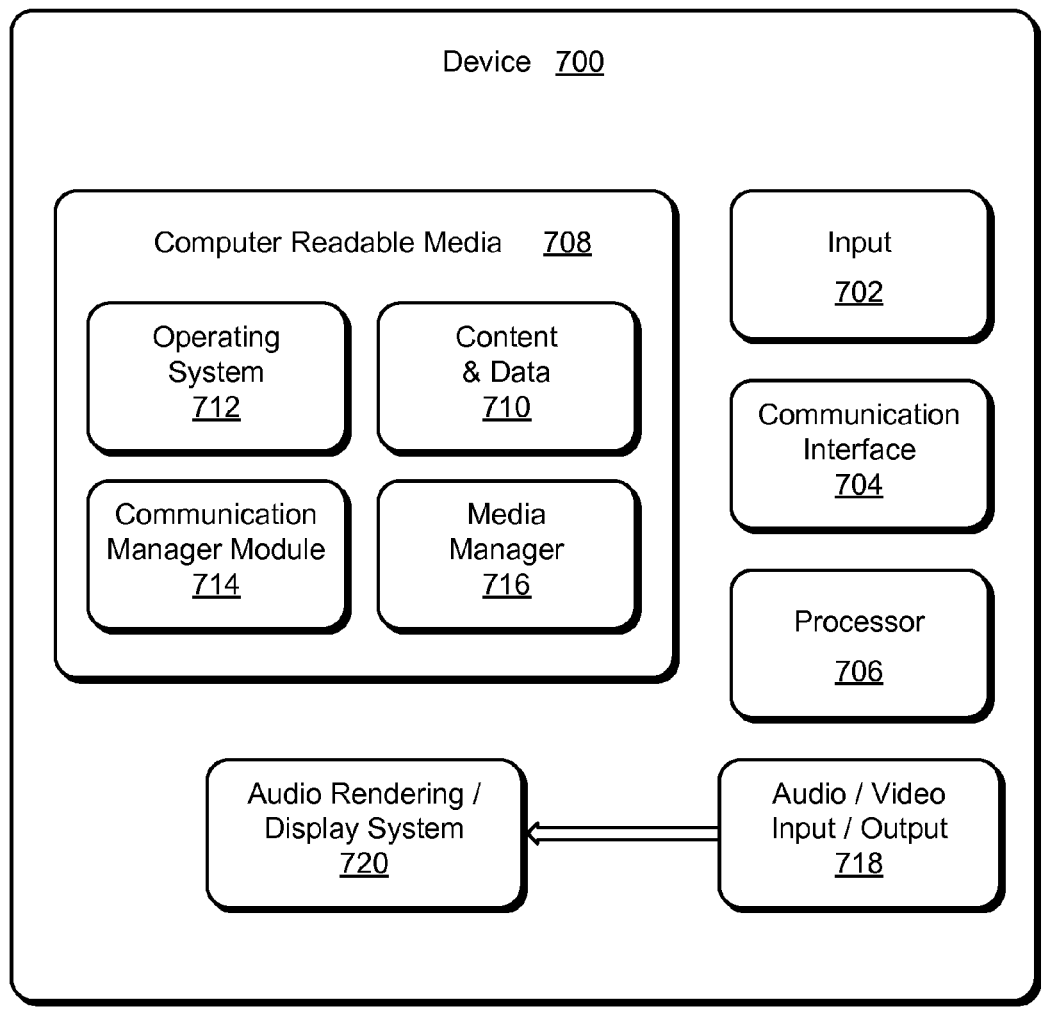
FIG. 7 illustrates various components of an example device that can be implemented in various embodiments as any type of a mobile device to implement embodiments of devices, features, and systems for mobile communications.

FIG. 7 illustrates various components of an example device 700 that can be implemented in various embodiments as any type of a mobile device to implement embodiments of devices, features, and systems for mobile communications. For example, device 700 can be implemented as any of the mobile communications devices 102 described with reference to respective FIGS. 1-4. Device 700 can also be implemented to access a network-based service, such as a content service.

Device 700 includes input(s) 702 that may include Internet Protocol (IP) inputs as well as other input devices, such as the keyboard 112 of FIGS. 1-17. Device 700 further includes communication interface(s) 704 that can be implemented as any one or more of a wireless interface, any type of network interface, and as any other type of communication interface. A network interface provides a connection between device 700 and a communication network by which other electronic and computing devices can communicate data with device 700. A wireless interface enables device 700 to operate as a mobile device for wireless communications.

Device 700 also includes one or more processors 706 (e.g., any of microprocessors, controllers, and the like) which process various computer-executable instructions to control the operation of device 700 and to communicate with other electronic devices. Device 700 can be implemented with computer-readable media 708, such as one or more memory components, examples of which include random access memory (RAM) and non-volatile memory (e.g., any one or more of a read-only memory (ROM), flash memory, EPROM, EEPROM, etc.).

Computer-readable media 708 provides data storage to store content and data 710, as well as device applications and any other types of information and/or data related to operational aspects of device 700. For example, an operating system 712 can be maintained as a computer application with the computer-readable media 708 and executed on processor(s) 706. Device applications can also include a communication manager module 714 (which may be used to provide telephonic functionality) and a media manager 716.

Device 700 also includes an audio and/or video output 718 that provides audio and/or video data to an audio rendering and/or display system 720. The audio rendering and/or display system 720 can be implemented as integrated component(s) of the example device 700, and can include any components that process, display, and/or otherwise render audio, video, and image data. Device 700 can also be implemented to provide a user tactile feedback, such as vibrate and haptics.

The communication manager module 714 is further illustrated as including a keyboard module 722. The keyboard module 722 is representative of functionality employ one or more of the techniques previously described in relation to FIGS. 1-6.

Generally, the blocks may be representative of modules that are configured to provide represented functionality. Further, any of the functions described herein can be implemented using software, firmware (e.g., fixed logic circuitry), manual processing, or a combination of these implementations. The terms "module," "functionality," and "logic" as used herein generally represent software, firmware, or a combination of software and firmware. In the case of a software implementation, the module, functionality, or logic represents program code that performs specified tasks when executed on a processor (e.g., CPU or CPUs). The program code can be stored in one or more computer readable memory devices. The features of the techniques described above are platform-independent, meaning that the techniques may be implemented on a variety of commercial computing platforms having a variety of processors.

Although the invention has been described in language specific to structural features and/or methodological acts, it is to be understood that the invention defined in the appended claims is not necessarily limited to the specific features or acts described. Rather, the specific features and acts are disclosed as example forms of implementing the claimed invention.

What is claimed is:

1. A mobile communications device comprising:
 a display device having touchscreen functionality;
 a keyboard having a plurality of physical keys that include a dedicated key and letter keys arranged according to a QWERTY layout; and
 one or more modules that are configured to output a user interface on the display device responsive to selection of the dedicated key and further configured to load a library of characters for display on the display device responsive to selection of the dedicated key, the user interface having a plurality of portions that are selectable via the touchscreen functionality to cause input of a respective one of a plurality of emoticons from an emoticon library.

2. A mobile communications device as described in claim 1, wherein the dedicated key is selectable solely for output of the user interface.

3. A mobile communications device as described in claim 1, wherein one or more of the plurality of emoticons represents a respective one of a plurality of facial expressions.

4. A mobile communications device as described in claim 1, wherein at least a subset of the physical keys are selectable to cause output of a letter or a number when selected concurrently with another one of the physical keys.

5. A mobile communications device as described in claim 4, wherein the other one of the physical keys is an ALT key.

6. A mobile communications device as described in claim 4, wherein the subset of the physical keys of the keyboard is arranged according to a telephone keypad layout.

7. A mobile communications device as described in claim 6, wherein each of the subset of the physical keys includes indicia of a respective number and letter for input via the physical key on the physical key.

8. A mobile communications device as described in claim 6, wherein the input of the emoticon is included in a message to be communicated via a network.

9. A mobile communications device as described in claim 8, wherein the message is a simple message service (SMS) text message or an email.

10. A mobile communications device as described in claim 8, wherein the message is a status message for a social network.

11. A mobile communications device as described in claim 1, wherein the dedicated key includes physical indicia of an emoticon formed using a plurality of punctuation marks.

12. A mobile communications device as described in claim 1, wherein the letter keys are not selectable singly or in combination with one or more other said physical keys to provide more than two inputs.

13. A mobile communications device as described in claim 1, wherein at least one said emoticon is displayed in the user interface without using a punctuation mark.

14. A method comprising:
 outputting a library of characters for display on a user interface on a display device of a mobile communications device responsive to selection of a dedicated physical key of a keyboard that includes a plurality of letter keys; and
 receiving a selection of a portion of the user interface via touchscreen functionality of the mobile communications device to cause input of a respective one of a plurality of emoticons from an emoticon library.

15. A method as described in claim 14, wherein the dedicated key is selectable solely for output of the user interface.

16. A method as described in claim 14, wherein one or more of the plurality of emoticons represents a respective one of a plurality of facial expressions.

17. A method as described in claim 14, wherein the dedicated key includes physical indicia of an emoticon formed using a plurality of punctuation marks.

18. A method as described in claim 14, wherein at least one said emoticon is displayed in the user interface without using a punctuation mark.

19. A mobile communications device comprising:
a display device having touchscreen functionality;
a keyboard having a plurality of physical keys that includes:
  letter keys arranged according to a QWERTY layout; and
  a dedicated key that is selectable solely to cause output of a library of characters for display on a user interface on the display device having a plurality of portions that are selectable via the touchscreen functionality to cause input of a respective one of a plurality of emoticons from an emoticon library.

20. A mobile communications device as described in claim 19, wherein one or more of the plurality of emoticons represents a respective one of a plurality of facial expressions.

* * * * *